(12) United States Patent
Uno

(10) Patent No.: US 7,941,579 B2
(45) Date of Patent: May 10, 2011

(54) COMMUNICATION SYSTEM FOR AUTHENTICATING AUTHORITY OF HOST DEVICE FOR ACCESSING STORAGE MEDIUM SET TO PERIPHERY DEVICE

(75) Inventor: Fumitoshi Uno, Okazaki (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 572 days.

(21) Appl. No.: 11/822,004

(22) Filed: Jun. 29, 2007

(65) Prior Publication Data
US 2008/0005116 A1    Jan. 3, 2008

(30) Foreign Application Priority Data
Jun. 30, 2006    (JP) .............................. P2006-181982

(51) Int. Cl.
G06F 13/38    (2006.01)
G06F 21/00    (2006.01)
H04L 9/32    (2006.01)

(52) U.S. Cl. .......... 710/62; 713/150; 713/160; 713/161; 713/168; 713/182; 726/27

(58) Field of Classification Search ........................ None
See application file for complete search history.

(56) References Cited

U.S. PATENT DOCUMENTS

| | | | |
|---|---|---|---|
| 6,088,802 A * | 7/2000 | Bialick et al. ...................... | 726/3 |
| 6,367,017 B1 * | 4/2002 | Gray .................................. | 726/9 |
| 7,111,172 B1 * | 9/2006 | Duane et al. ..................... | 713/182 |
| 7,293,014 B2 * | 11/2007 | Subramaniam et al. .......... | 707/3 |
| 7,443,527 B1 * | 10/2008 | Shigeeda ...................... | 358/1.15 |
| 7,815,100 B2 * | 10/2010 | Adams et al. ................. | 235/375 |
| 7,839,515 B2 * | 11/2010 | Shigeeda ...................... | 358/1.14 |
| 2002/0073025 A1 * | 6/2002 | Tanner et al. .................... | 705/39 |
| 2004/0073792 A1 * | 4/2004 | Noble et al. ................... | 713/168 |
| 2006/0036853 A1 * | 2/2006 | Chen et al. ..................... | 713/161 |
| 2006/0219776 A1 * | 10/2006 | Finn .............................. | 235/380 |

FOREIGN PATENT DOCUMENTS

| | | |
|---|---|---|
| JP | 2003-76611 | 3/2003 |
| JP | 2005-18645 | 1/2005 |
| JP | 2005-107875 | 4/2005 |

OTHER PUBLICATIONS

Bradley Mitchell, Industries First 802.11g Wireless USB Adapter, Sep. 25, 2003, About.com.*
Secretariet: Computer & Business Equipment Manufacturer Association, Information technology-Small Computer System Interface-2, Rev Sep. 7, 1993, Maxtor Corporation, pp. 104-108.*

* cited by examiner

*Primary Examiner* — Henry W Tsai
*Assistant Examiner* — Michael Sun
(74) *Attorney, Agent, or Firm* — McDermott Will & Emery LLP

(57) ABSTRACT

A search-instruction-data creating unit issues a search request command to a peripheral device, and creates search instruction data including a predetermined field that stores supplementary information. A search-instruction-data transmitting unit transmits the search instruction data to the peripheral device. A security-reference-information transmitting unit transmits, to the peripheral device, security reference information serving as the supplementary information. A search-report-data generating unit generates a search report data upon receiving the search instruction data. A search-report-data transmitting unit transmits the search report data to a host device. A supplementary-information extracting unit extracts the supplementary information from the predetermined field of the search instruction data. An authenticating unit authenticates an access authority for accessing a storage medium from the host device, based both on security master information stored in the storage medium and on the security reference information that is received from the host device.

12 Claims, 12 Drawing Sheets

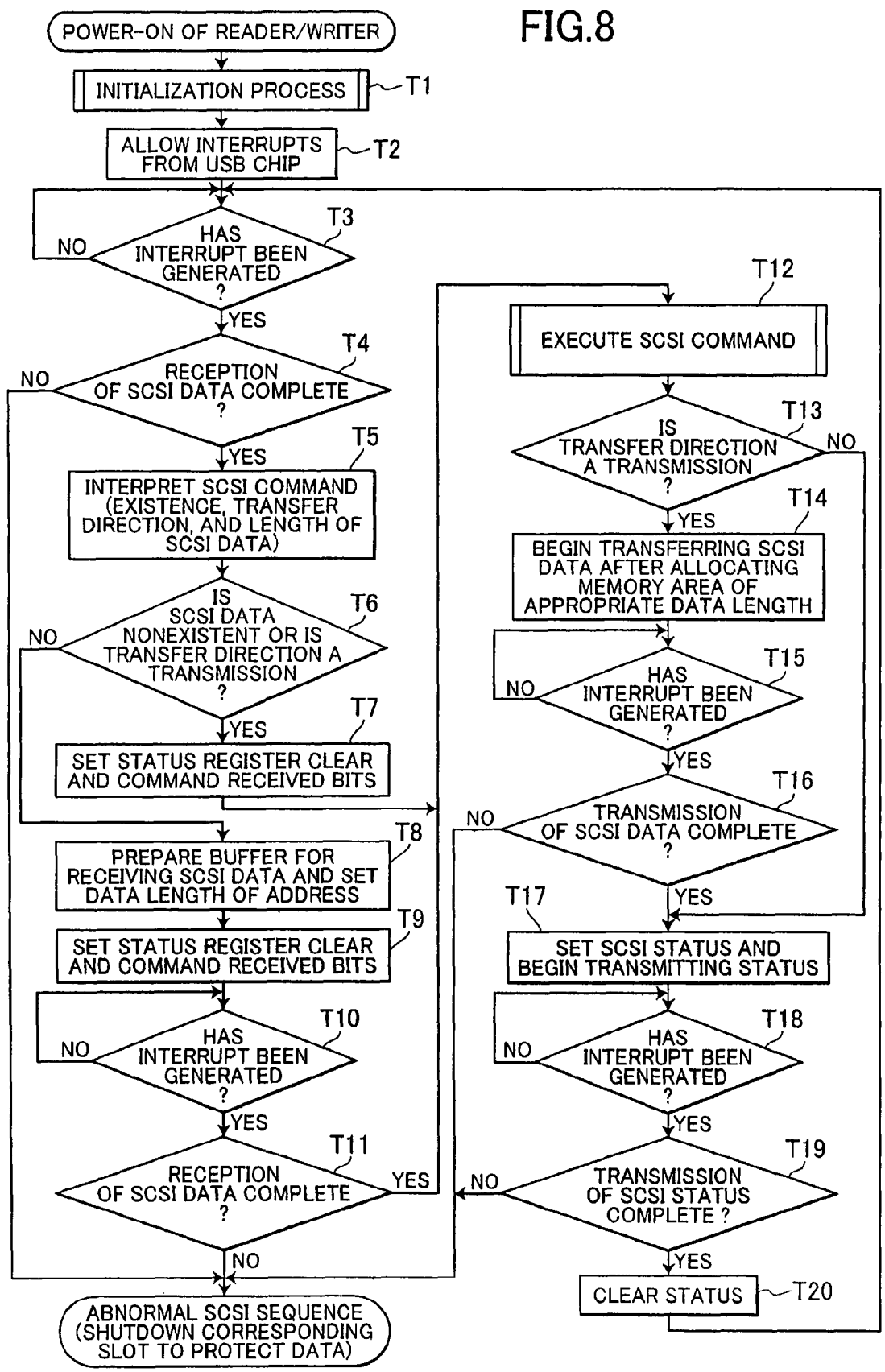

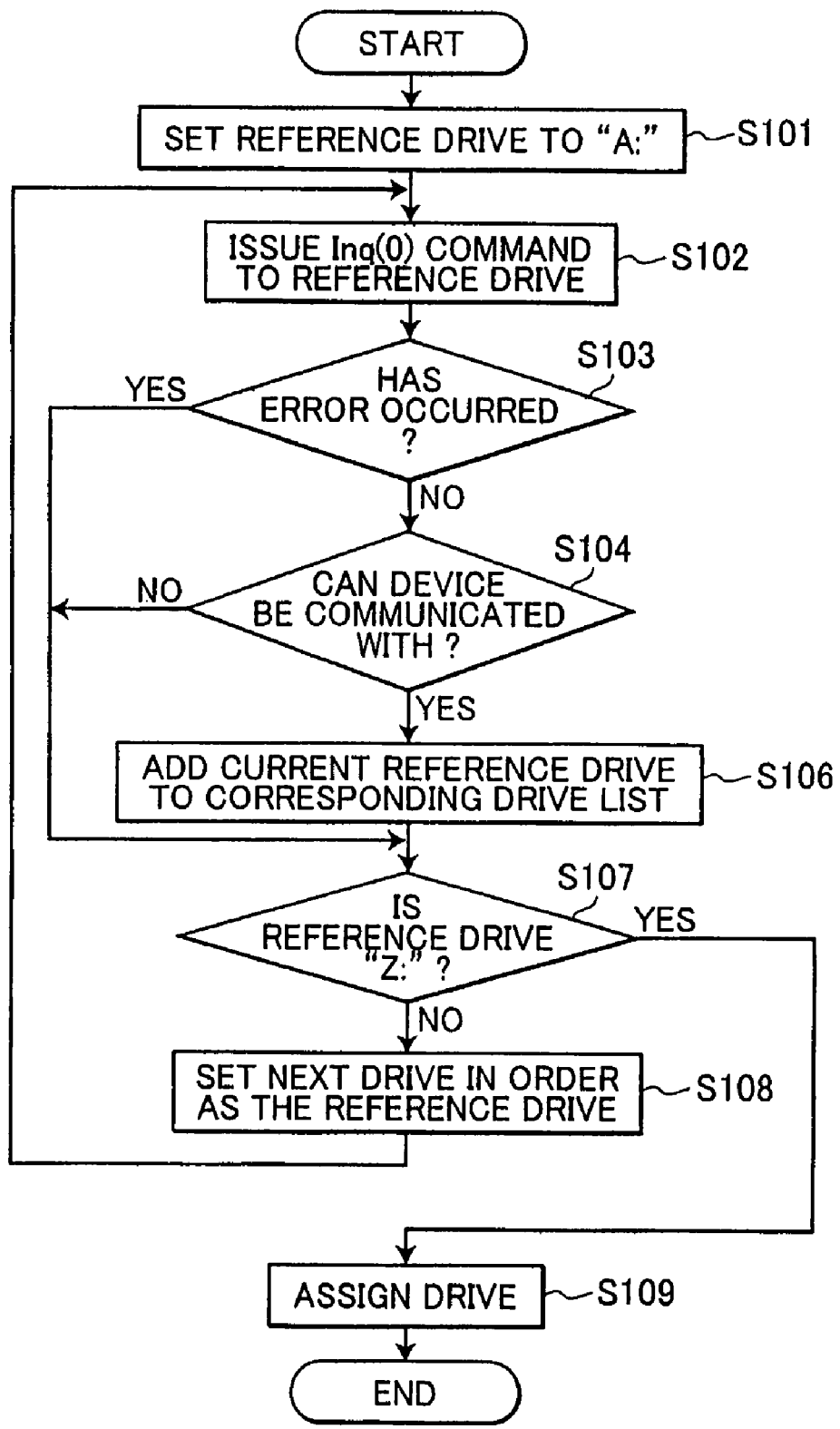

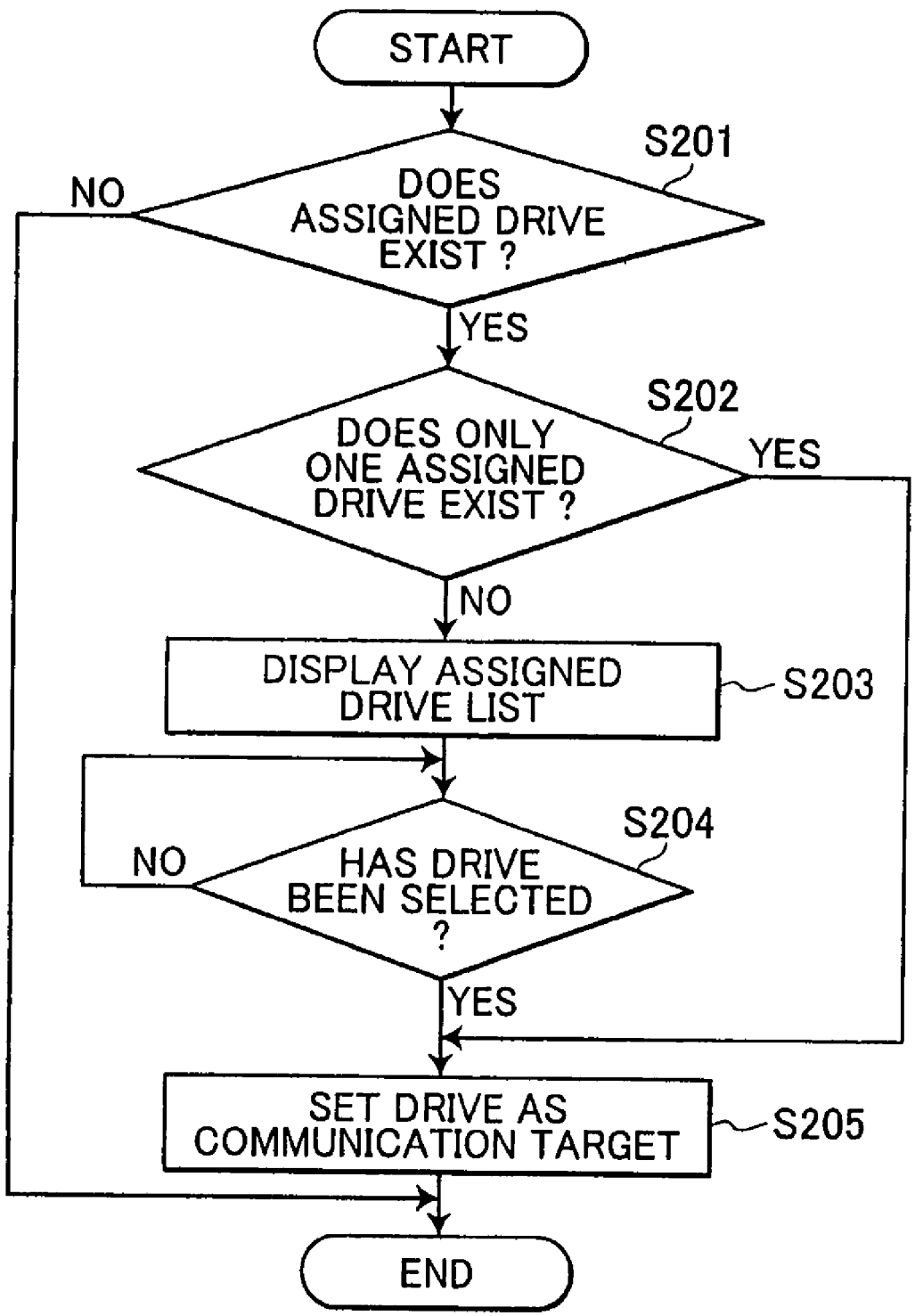

US 7,941,579 B2

COMMUNICATION SYSTEM FOR AUTHENTICATING AUTHORITY OF HOST DEVICE FOR ACCESSING STORAGE MEDIUM SET TO PERIPHERY DEVICE

CROSS REFERENCE TO RELATED APPLICATIONS

This application claims priority from Japanese Patent Application No. 2006-181982 filed Jun. 30, 2006. The entire content of the priority application is incorporated herein by reference.

TECHNICAL FIELD

The invention relates to a communication system including a personal computer, workstation, or other host device, and a peripheral device connected to the host device. The invention also relates to the peripheral device employed in this communication system.

BACKGROUND

Storage media known as memory cards have been widely used in recent years. These memory cards are configured of flash memory or other nonvolatile memory that has been packaged in a card shape. The popularity of these memory cards has spread rapidly in such applications as storage media for digital cameras, portable music players, and other digital devices. A variety of memory cards with no common standardized specifications have appeared on the market, including CompactFlash (registered trademark; hereinafter also abbreviated as "CF"), SmartMedia (registered trademark; hereinafter also abbreviated as "SM"), Memory Stick (registered trademark; hereinafter also abbreviated as "MS"), and Secure Digital Cards (registered trademark; hereinafter also abbreviated as "SD").

Memory card readers/writers (hereinafter abbreviated as "readers/writers"), which are capable of reading from and writing to memory cards, are connected to the personal computer or the like, enabling the personal computer to access the memory cards. With this construction, data communications can be performed between the personal computer and the memory cards. The types of readers/writers include a single-slot reader/writer equipped with one slot for inserting a memory card, and a multi-slot reader/writer provided with a plurality of slots so that data can be accessed from a plurality of memory cards. These readers/writers are described in U.S. Patent Application Publication No. 2005/0023339 (corresponding to Japanese Patent Application Publications Nos. 2005-18645 and 2005-107875).

As the volume of data transfers has increased dramatically with the popularity of multimedia, serial communications has become the common format for communications between the readers/writers described above and a personal computer. However, many devices continue to use the system employed in parallel communication peripheral devices for arbitration/access control from the perspective of facilitating the control of data accesses for a plurality of storage medium. A typical example is a system designed to implement data communications between a personal computer and reader/writer based on a protocol defined by the SCSI standard (also referred to as the SCSI protocol below). The SCSI standard was established by the American National Standard Institute (ANSI) and has been widely adopted throughout the world as a communication protocol because this protocol can enhance the versatility of personal computers and readers/writers. In the following description, "SCSI standard" will primarily refer to SCSI-2.

According to SCSI protocol, the personal computer, which is the host device, functions as the initiator for starting communication events, while the peripheral device functions as the target of communications from the host device. The personal computer issues a sequence of commands to the peripheral device for executing a communication event, and upon receiving these commands the peripheral device sequentially executes processes corresponding to the commands (such as data reading, writing, deleting, and various incidental processes) and issues response information corresponding to the execution results to the host device. Hence, the commands for executing the communication event are restricted to one direction from the host device to the peripheral device.

SUMMARY

As described above, SCSI communications are bi-directional communications between the personal computer and the peripheral device, but restrict the direction in which commands for executing the communication event are issued to one direction from the personal computer to the peripheral device so that the personal computer functioning as the initiator always initiates the communication processes. In other words, based on the SCSI protocol, the peripheral device cannot issue commands to the host device for initiating a communication event, making it very difficult to perform a communication process using a password or the like to authorize accesses of the memory cards mounted in the peripheral device.

In view of the foregoing, it is an object of the invention to provide a communication system capable of simplifying the implementation of a communication mechanism for authorizing accesses to a storage medium mounted in the peripheral device, regardless of the unidirectional restriction on commands issued from the personal computer to the peripheral device. It is another object of the invention to provide a peripheral device employed in the communication system.

In order to attain the above and other objects, the invention provides a communication system. The communication system includes a host device and a peripheral device. The host device has an authority to initiate a communication event. The peripheral device is connected to the host device and serves as a communication target of the host device. The host device is configured to issue a command for executing the communication event to the peripheral device. The peripheral device is configured to execute a data process based on the command upon receiving the command and to return to the host device response information based on execution results of the data process. The host device and the peripheral device have a communication protocol that restricts a direction for issuing the command to a one-way direction from the host device to the peripheral device. The peripheral device is constituted by a storage device having a slot to which a storage medium can be detachably mounted. The storage medium has a non-volatile memory that accepts data access including reading and writing of data. The peripheral device is configured to execute the data access to the storage medium based on the communication event.

The host device includes a search-instruction-data creating unit, a search-instruction-data transmitting unit, a security-reference-information acquiring unit, and a security-reference-information transmitting unit. The search-instruction-data creating unit issues, to the peripheral device, a search request command that requests that the peripheral device performs a search report process for the peripheral device itself, and creates search instruction data indicative of contents of the search report process and having a first predetermined frame format. The first predetermined frame format includes a predetermined field that stores supplementary information. The search-instruction-data transmitting unit transmits the search instruction data to the peripheral device. The security-reference-information acquiring unit acquires security reference information. The security-reference-information transmitting unit transmits, to the peripheral device, the security reference information that is acquired by the security-reference-information acquiring unit and that serves as the supplementary information.

The peripheral device includes a search-report-data generating unit, a search-report-data transmitting unit, a supplementary-information extracting unit, and an authenticating unit. The search-report-data generating unit generates a search report data having a second predetermined frame format upon receiving the search instruction data. The search-report-data transmitting unit transmits to the host device the search report data as the response information. The supplementary-information extracting unit extracts the supplementary information from the predetermined field of the search instruction data. The authenticating unit authenticates an access authority for accessing the storage medium from the host device, based both on a security master information stored in the storage medium and on the security reference information that is received from the host device.

According to another aspect, the invention also provides a peripheral device. The peripheral device is configured to be connected to a host device and serves as a communication target of the host device. The host device is configured to issue a command for executing the communication event to the peripheral device. The peripheral device is configured to execute a data process based on the command upon receiving the command and to return to the host device response information based on execution results of the data process. The host device and the peripheral device have a communication protocol that restricts a direction for issuing the command to a one-way direction from the host device to the peripheral device. The peripheral device is constituted by a storage device having a slot to which a storage medium can be detachably mounted. The storage medium has a non-volatile memory that accepts data access including reading and writing of data. The peripheral device is configured to execute the data access to the storage medium based on the communication event. The peripheral device includes a search-report-data generating unit, a search-report-data transmitting unit, a supplementary-information extracting unit, and an authenticating unit. The search-report-data generating unit generates a search report data having a second predetermined frame format upon receiving search instruction data from the host device. The search instruction data has a first predetermined frame format that includes a predetermined field that stores supplementary information. The search-report-data transmitting unit transmits to the host device the search report data as the response information. The supplementary-information extracting unit extracts the supplementary information from the predetermined field of the search instruction data. The authenticating unit authenticates an access authority for accessing the storage medium from the host device, based both on a security master information stored in the storage medium and on a security reference information that is received from the host device.

BRIEF DESCRIPTION OF THE DRAWINGS

Embodiments in accordance with the invention will be described in detail with reference to the following figures wherein:

FIG. 8 is a flowchart illustrating steps in a process performed by the SCSI command/data/status transmission/reception unit in the multi-reader/writer;

FIG. 10 is a flowchart illustrating steps in a drive assignment process in FIG. 9;

FIG. 11 is a flowchart illustrating steps in a drive setting process of FIG. 9;

DETAILED DESCRIPTION

Figure 1A:
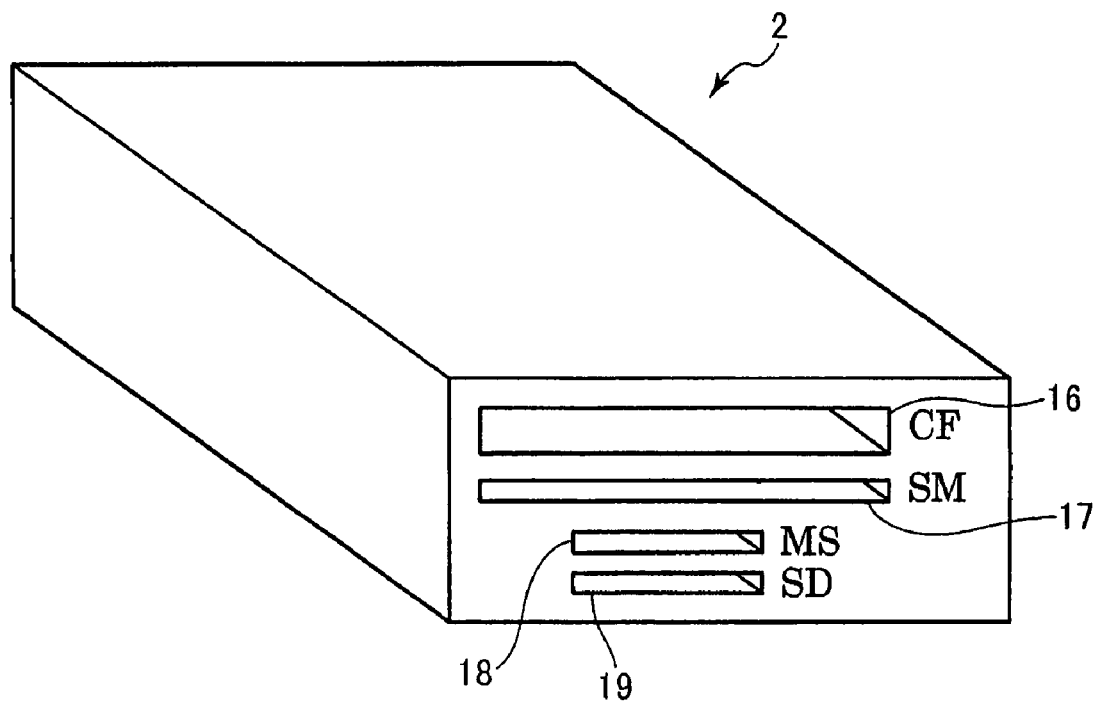
FIG. 1A is a perspective view from the front side showing a multi-reader/writer employed in a communication system according to an embodiment of the invention.

A communication system and a peripheral device according to an embodiment of the invention will be described.

The main objective of the communication protocol is the exchange of data files between the host device and a storage device serving as the peripheral device, wherein data for a control process not supported by the communication protocol (and particularly a process for initiating a communication event on the peripheral device) must be handled as supplementary information independent from control information supported by the communication protocol. It is not practical to write this type of supplementary information in the body of the data file being exchanged since this would require starting an application program for opening the data file on the host device or peripheral device for referencing the supplementary information in order to execute control processes and the like. However, with the construction described here, a supplementary-information communication mechanism is capable of reliably transmitting supplementary information from a host device to a peripheral device in a data file under control of the communication protocol. The supplementary-information communication mechanism uses a search request command for requesting the peripheral device to perform a search report process on the peripheral device itself, and writes the supplementary information in a predetermined field of search instruction data created when issuing the search request command.

The supplementary-information communication mechanism can transmit security reference information acquired from the host device to the peripheral device as supplementary information in the search instruction data. The peripheral device is also provided with an authenticating unit that authenticates whether a host device has access privileges for accessing the storage medium using security master information written in the storage medium and the security reference information received from the host device. This construction can facilitate implementation of a communication mechanism for ensuring the security of the storage medium mounted in the peripheral device, even though the issuing of commands is restricted to one direction from the host device to the peripheral device.

The communication protocol may be the SCSI protocol (any of SCSI-1, SCSI-2, and SCSI-3, although SCSI-2 is currently used in most OS kernels), but the invention is not limited to this protocol.

The host device may be provided with a communication interface compliant with a different protocol capable of peer-to-peer communications with a peripheral device (such as IEEE 1394 or 1394b), and the peripheral device may be connected to the connector of this communication interface. With this hardware construction, since the peripheral device can issue commands for communication processes to the communication interface (i.e., the host device), it is possible to eliminate functions compliant with the communication protocol, such as the trigger report request command issuing means (on the host device) and the trigger issuance report data returning means (on the peripheral device). However, a module is required on the host device for handling different protocols to achieve peer-to-peer communication, inevitably requiring increased costs in the communication interface.

The peripheral device and the host device are connected via a serial communication mechanism that allows the host device to poll the peripheral device, but does not allow the peripheral device to poll the host device. The communication system is capable of implementing data transfers between the host device and the peripheral device for executing the communication event using a form of serial communications in which the host device polls the peripheral device. Since this construction prevents the peripheral device from polling the host device (in other words, the peripheral device has no authority to initiate communications), the communication interface on the host device for directly connecting the peripheral device is greatly simplified, thereby reducing the weight and cost of the system structure. Universal Serial Bus (USB) is one example of this type of serial communication standard. In the present specification, the SCSI protocol is used as the communication protocol, and the peripheral device connected to the host device by a serial communication bus conforming to the USB protocol is referred to as a USB/SCSI peripheral device.

When employing USB, the peripheral device is configured of an access control device for controlling communication processes on the peripheral device by sequentially executing a command analysis step for receiving commands from the host device and analyzing the content of the commands, a data process step for performing processes reflecting the content of the commands, and a response-information returning step for returning response information indicating results of the data processes to the host device; and a serial communication unit for executing bi-directional transfers of the commands and response information through serial communications according to a format in which the host device polls a plurality of the access control devices. The access control device is configured of a transmission/reception unit for transmitting and receiving commands and response information with a serial communication unit and a main executing unit for analyzing commands and controlling data processes based on the content of the commands. Here, the transmission/reception unit and the serial communication unit can be integrated on a special integrated chip. With this construction, commands and response information can be exchanged according to a communication protocol, such as SCSI, without problem via a bus using serial communications conforming to the USB protocol.

More specifically, the serial communication unit on the peripheral device can be provided with a communication bus connector for connecting with the serial communication from the host device, and a communication control unit for implementing communication processes to transfer commands and response information between the serial communication bus and the transmission/reception unit; and the communication control unit can be configured of a protocol engine for communication processes connected to the communication bus connector, and a control management unit connected to the protocol engine via a bi-directional control endpoint configured of FIFO memory for managing transfer processes. The transmission/reception unit can be connected to the protocol engine by separate input and output paths via an input endpoint configured of FIFO memory for inputting data to the protocol engine, and an output endpoint configured of FIFO memory for outputting data from the protocol engine. The communication control unit can be configured to receive identification information from the host device identifying the transmission reception unit targeted for a data access and the endpoint corresponding to the transmission/reception unit and to poll each transmission/reception unit as a target device. By providing endpoints serving as transmission/reception data buffers independently on the transmission side and the reception side, the data transfer direction can easily be identified by specifying an endpoint during polling.

The host device includes an authentication-result requesting unit that transmits authentication-result request information to the peripheral device as the supplementary information, thereby requesting authentication-result reflecting information that reflects authentication results obtained by the authenticating unit. The peripheral device further includes an authentication-result returning unit that returns the search report data to the host device as the response information. The search report data includes the authentication-result reflecting information in a predetermined field. The authentication-result reflecting information serves as supplementary response information in response to the supplementary information. The host device further includes an authentication-result-reflecting-information outputting unit that outputs the authentication-result reflecting information returned by the authentication-result returning unit. The supplementary-information communication mechanism can return authentication results for storage medium from the peripheral device to the host device without problems. Further, the host device outputs the authentication-result reflecting information so that the user can learn reliably whether authentication was successful.

The storage medium has a storage area divided into a normal area that can be accessed from the host device, even when the authenticating unit has rejected authentication of access privileges, and a security area that can be accessed from the host device only when the authenticating unit has accepted authentication of access privileges. The peripheral device further includes an access-mode setting unit and an access-mode-setting controlling unit. The access-mode setting unit sets an access mode for accessing the storage medium to one of a normal mode allowing access to only the normal area, and a security mode allowing access to the security area. The access-mode-setting controlling unit controls the access-mode setting unit to set the access mode to the security mode only when the authenticating unit has accepted authentication. This construction reliably protects an area in the data storage area of the storage medium specified as the security area.

The host device includes an access-mode-report requesting unit that transmits access-mode-report instruction information to the peripheral device as the supplementary information, thereby requesting that the peripheral device report a type of access mode set in the peripheral device. The peripheral device includes an access-mode-report returning unit that returns the search report data to the host device as the response information. The search report data includes access-mode-report information indicative of the type of access mode in a predetermined field. The access-mode-report information serves as supplementary response information in response to the supplementary information. The host device includes an access-mode-type displaying unit that displays the type of access mode returned by the access-mode-report returning unit. With this construction, the user can easily learn the access mode set on the peripheral device through a display on the host device.

The host device includes an access-mode selecting unit and a normal-mode-shift-instruction-information transmitting unit. The access-mode selecting unit selects either one of the normal mode and the security mode as the access mode. The normal-mode-shift-instruction-information transmitting unit transmits normal-mode-shift instruction information to the peripheral device as the supplementary information when the normal mode has been selected on the host device. The normal-mode-shift instruction information instructs the peripheral device to shift into the normal mode. The peripheral device includes a normal-mode-setting-complete-report-information returning unit that returns, to the host device, normal-mode-setting-complete report information contained in a predetermined field of the search report data when the access-mode setting unit has set the access mode to the normal mode. The normal-mode-setting-complete report information reports that the normal mode has been set and serves as supplementary response information in response to the supplementary information. With this construction, when the normal mode is selected on the host device, a command can easily be transferred to the peripheral device to quickly set the peripheral device to the normal mode.

On the other hand, the host device includes an inputting unit that inputs the security reference information. The security-reference-information transmitting unit transmits the inputted security reference information to the peripheral device as the supplementary information. With this construction, when the security mode is selected on the host device, the security reference information inputted by the user can be transferred to the peripheral device without problem, and the peripheral device can perform an authentication process based on the security reference information and can quickly set the access mode to the security mode when authentication is accepted.

The security reference information may be a password used as an encryption key. Specifically, the storage medium may be provided with a check sector for storing predetermined original check data as check data that has been encrypted using a master encryption key, and the peripheral device may be provided with a security-master-information storing unit for storing the original check data as security master information. The authenticating unit can generate check target information by decoding the check data with an encryption key received from the host device and can accept authentication when the check target information matches the security master information or reject authentication when the check target information does not match. A checking process combining a password and encryption can protect data more reliably. Further, the above method does not require that the peripheral device have a password registration area for each user's password, and enhances safety by not writing the passwords directly in the storage medium (the data written directly to the storage medium is the result of encrypting the original check data using the password as an encryption key).

The communication protocol specifies that the predetermined field of the search instruction data stores primary information that is different from the supplementary information. The search-instruction-data creating unit stores the supplementary information in the predetermined field together with the primary information. When using a communication protocol conforming to an existing communication standard, such as the SCSI protocol, the frame of the search instruction data may not include extra space for setting a special field for writing supplementary information. In such cases, the supplementary information can be written together with primary information in a predetermined field prepared for the primary information different from the supplementary information described above.

The predetermined field in the search instruction data is an allocation-length setting field for storing allocation-length information used to specify a memory region on the storage medium. The memory region is allocated for reading or writing of data when the peripheral device executes the communication event for reading or writing of data in the storage medium according to the communication protocol. The search-instruction-data creating unit stores the supplementary information in the allocation-length setting field, such that the supplementary information shares the allocation-length setting field with the allocation-length information that serves as the primary information. In this way, unique supplementary information not defined in the communication protocol can be transferred to the peripheral device in a form combined with the allocation-length information.

The allocation-length setting field is set to a predetermined bit length in the communication protocol. A bit length for a maximum possible allocation length is set smaller than the predetermined bit length. When the allocation-length setting field stores an allocation length exceeding the maximum possible allocation length, the supplementary-information extracting unit determines that an actual value of the allocation length equals to the maximum possible allocation length regardless of the allocation length described in the allocation-length setting field, and extracts bit values that exceeds the maximum possible allocation length as the supplementary information. For example, when using the CDB of an Inquiry command described later from SCSI protocol as search instruction data, this CDB is configured of only fields assigned for SCSI protocol control and at a glance appears to have no room for writing new data. However, by setting the maximum value for the allocation-length setting field for setting the allocation length, which is primary information in the SCSI protocol, to a value less than the total number of bits in this field, bits used to describe the allocation length that become redundant when this maximum value is exceeded can, therefore, be used to signify supplementary information.

The peripheral device includes an exchange-notification-information holding unit and an exchange-notification-information holding controlling unit. The exchange-notification-information holding unit holds exchange notification information that is used to notify the host device that the storage medium has been exchanged when such an exchange has occurred. The exchange-notification-information holding controlling unit clears the exchange notification information when a predetermined first-type command has been received from the host device and the first-type command has been executed, and maintains the exchange notification information when a second-type command has been received from the host device and the second-type command has been executed. The second-type command is different from the first-type command. Preferably, the second-type command is used as the search request command. This is because, when the first-type command is used for this purpose, exchange notification information is cleared upon completion of the process, even though a transmission event for supplementary information does not particularly require exchange notification information, while the system component that actually requires this exchange notification information on the host device (the file system, for example) cannot acquire the exchange notification information, leading to corrupted data stored on the storage medium and other problems.

The search request command is a configuration-attribute search request command that commands the peripheral device to report configuration-attribute identification information that identifies configuration and attributes of the peripheral device. This command is often used to execute a communication event in which the peripheral device identifies its own configuration and attributes in order to determine at startup what type of peripheral device is connected according to the communication protocol (the target according to the SCSI protocol). However, the configuration-attribute search request command is executed in the embodiment at an arbitrary timing after startup for implementing the supplementary-information communication mechanism. A communication event regulated by the configuration-attribute search request command is essentially only designed to recognize the "features" of the peripheral device (which are not variable while the device is being used). However, since it is not desirable to unnecessarily influence the preserved state of the exchange notification information, when the storage medium is exchanged prior to or after the command is generated, it is preferable to use the configuration-attribute search request command as the second-type command. In this way, it is possible to prevent the problems described above by not affecting the preserved state of the exchange notification information, even if the command is repeatedly issued.

In the embodiment, the communication protocol is SCSI protocol that uses an Inquiry command as the search request command. In this case, the search instruction data transmitted from the host device (initiator) to the peripheral device (target) is a command descriptor block (CDB; the frame format for each command is defined in detail in the SCSI protocol) describing detailed content of the Inquiry command, and the search report data returned from the peripheral device to the host device is inquiry data (the frame format defined in detail in the SCSI protocol). Table 1 shows the CDB format corresponding to the Inquiry command.

TABLE 1

| Byte | \multicolumn{8}{c}{CDB — Bit} | | | | | | | |
|---|---|---|---|---|---|---|---|---|
| | 7 | 6 | 5 | 4 | 3 | 2 | 1 | 0 |
| 0 | \multicolumn{8}{c}{12h (operation code)} | | | | | | | |
| 1 | \multicolumn{3}{c}{LUN} | \multicolumn{4}{c}{Reserved} | \multicolumn{1}{c}{EVPD} | | | | | |
| 2 | \multicolumn{8}{c}{Page code} | | | | | | | |
| 3 | \multicolumn{8}{c}{Reserved} | | | | | | | |
| 4 | \multicolumn{8}{c}{Allocation length} | | | | | | | |
| 5 | \multicolumn{8}{c}{Control byte} | | | | | | | |

TABLE 2

CDB(0) (EVPD = 0)

| Byte | Value | Remarks |
|---|---|---|
| 0 | 0x12 | Inquiry code no. |
| 1 | 0x00 | SCSI-LUN, EVPD = 0 |
| 2 | 0x00 | Fixed to 0 when EVPD = 0 |
| 3 | 0x00 | Reserved (fixed to 0) |
| 4 | nn | Allocation length (allocation length region) |
| 5 | 0x00 | Control byte (fixed to 0) |

In the SCSI protocol, the host device can specify the type of inquiry data returned from the peripheral device. Specifically, the CDB corresponding to the Inquiry command is provided with a 1-bit field called Enable Vital Product Data (EVPD), and an 8-bit field called a page code. Table 2 shows inquiry data for a CDB with a "0" in the EVPD field (hereinafter referred to as CDB(0)), while Table 3 shows standard inquiry data (hereinafter referred to as "S/I data") returned from the peripheral device, with a common format and content unrelated to the specifications of the peripheral device. Free regions in the S/I data not directly used for communication control according to the SCSI protocol can be used as a description field for supplementary response information.

TABLE 3

Standard Inquiry Data

| Byte | Value | Remarks |
|---|---|---|
| 0 | 0x00 | Direct access device |
| 1 | 0x80 | Replaceable storage medium |
| 2 | 0x02 | SCSI-2 |
| 3 | 0x02 | SCSI-2 |
| 4 | 0x5B | Present to byte 95 |
| 5 | 0x00 | Reserved (fixed to 0) |
| 6 | 0x00 | Reserved (fixed to 0) |
| 7 | 0x00 | Flags |
| 8-15 | | Vendor ID (an ASCII code indicating the manufacturer, for example) |
| 16-31 | | Product ID (an ASCII code indicating the model name, for example) |
| 32-35 | | Product version (an ASCII code indicating the version, for example) |
| 36-55 | | Vendor-specific data |
| 54 | | High-order 4 bits: physical interface information (0 = no information, 1 = USB, 2 = SCSI, and 3 = IDE) Low-order 4 bits: LUN information (USB-LUN in the case of USB and SCSI-LUN in the case of SCSI or IDE) |

TABLE 3-continued

Standard Inquiry Data

| Byte | Value | Remarks |
|---|---|---|
| 55 | | High-order 4 bits: USB multifunction device information (0 = no information, 1 = USB single-function, and 2 = USB multifunction device) Low-order 4 bits: indicates a multi-interface no. in the case of a USB multifunction device |
| 56-95 | 0x00 | Reserved (fixed to 0) |

For example, S/I data includes a field of fixed length for describing information specific to the device vendor (hereinafter referred to as the vendor-specific region. When free, the field can be used as a description field for response information. Further, the following free space can be used as a description field for the response information although the number of bits is few. Each of additional data length fields (data lengths beginning from byte 5 in the S/I data) is set to 8 bits. Depending on types of data, a maximum data length is shorter than 8 bits. In such cases, when the specified data length exceeds the maximum data length for the additional data length field, the data length is set to the maximum data length regardless of the content in the additional data length field. As a result, the region of bit values exceeding the maximum data length can essentially be used as "free space" for describing the supplementary response information.

On the other hand, when the CDB issued by the host device has a "1" in the EVPD field (hereinafter referred to as CDB (1)), as shown in Table 4, the peripheral device returns special inquiry data called vital product data (VPD) shown in Table 5 for providing more detailed or device specific information to the host device.

TABLE 4

CDB(1) (EVPD = 1)

| Byte | Value | Remarks |
|---|---|---|
| 0 | 0x12 | Inquiry code no. |
| 1 | 0x01 | SCSI-LUN, EVPD = 1 |
| 2 | 0xE0 | Page code when EVPD = 1 |
| 3 | 0x00 | Reserved (fixed to 0) |
| 4 | nn | Allocation length |
| 5 | 0x00 | Control byte (fixed to 0) |

TABLE 5

VPD (Inquiry data)

| Byte | Bit 7 | 6 | 5 | 4 | 3 | 2 | 1 | 0 |
|---|---|---|---|---|---|---|---|---|
| 0 | Qualifiers | | | Device type code | | | | |
| 1 | Page code | | | | | | | |
| 2 | Reserved | | | | | | | |
| 3 | Page length (n − 3) | | | | | | | |
| 4 | VPD information (page-specific) | | | | | | | |
| ... | | | | | | | | |
| n | | | | | | | | |

Various types of VPD have been defined, and the page code field in the CDB specifies the type of VPD (specifically, page code list (page code: $00_h$), FRU ASCII information (page code: $01_h$-$7F_h$), unit serial number (page code: $80_h$), operating mode definition (page code: $81_h$), ASCII operating mode definition (page code: $82_h$), and vendor-specific format (page code: $C0_h$-$FF_h$)). The peripheral device creates a VPD of the type specified in the page code field and returns the VPD to the host device. In particular, when the VPD is the FRU ASCII information format and the ASCII operating mode definition format, the peripheral device forms a field for the data length of a field required for writing ASCII information and an ASCII information field specified by this data length after the page length field. However, the following fields are vendor-specific regions and can be used as "free space" for describing supplementary response information. For example, if the ASCII information field in the VPD of the ASCII operating mode definition format is defined as a field having a small number of bytes (1-3 bytes, for example) for describing device version information or the like, a relatively large field length can be allocated in the remaining vendor-specific region for writing supplementary response information of a relatively large size.

Under the SCSI protocol, when an event or state changes in the target (peripheral device) or in one or a plurality of logical units in this device (one or a plurality of storage-medium insertion slots when the peripheral device is a storage device) asynchronously with operations on the host device (initiator), a function is provided for generating a unit attention condition used to notify the initiator of this change. If a storage medium is exchanged in the peripheral device, notification information for this exchange is reflected in the generated unit attention condition. In the SCSI protocol, if an Inquiry command is issued to the peripheral device holding such a unit attention condition, the Inquiry command is executed (inquiry data is created and returned) without clearing the unit attention condition (provided that the Inquiry command is issued before a copy aborted (CA) state is generated). Hence, when the storage medium has been exchanged, the unit attention condition including this exchange notification information is preserved by using the Inquiry command to start an event requesting supplementary response information, thereby preventing the loss of the exchange notification information. Clearly the Inquiry command corresponds to the second-type command described above.

Another search request command called a Request Sense command can be used in the SCSI protocol. The Request Sense command requests sense data from the peripheral device (target) reporting a cause or type of error, for example. The peripheral device returns sense data as search report data in a frame of the specified format. In principle, the peripheral device can use free space in the sense data to write supplementary response information to be returned to the host device. However, when a Request Sense command is issued to a peripheral device holding a unit attention condition in the SCSI protocol, the peripheral device is configured to clear the unit attention condition (provided that the Inquiry command is issued before the copy aborted (CA) state is generated). If the storage medium has been exchanged, the unit attention condition including this exchange notification information may be cleared, losing the information. Hence, the Request Sense command corresponds to the first-type command described above.

Figure 1B:
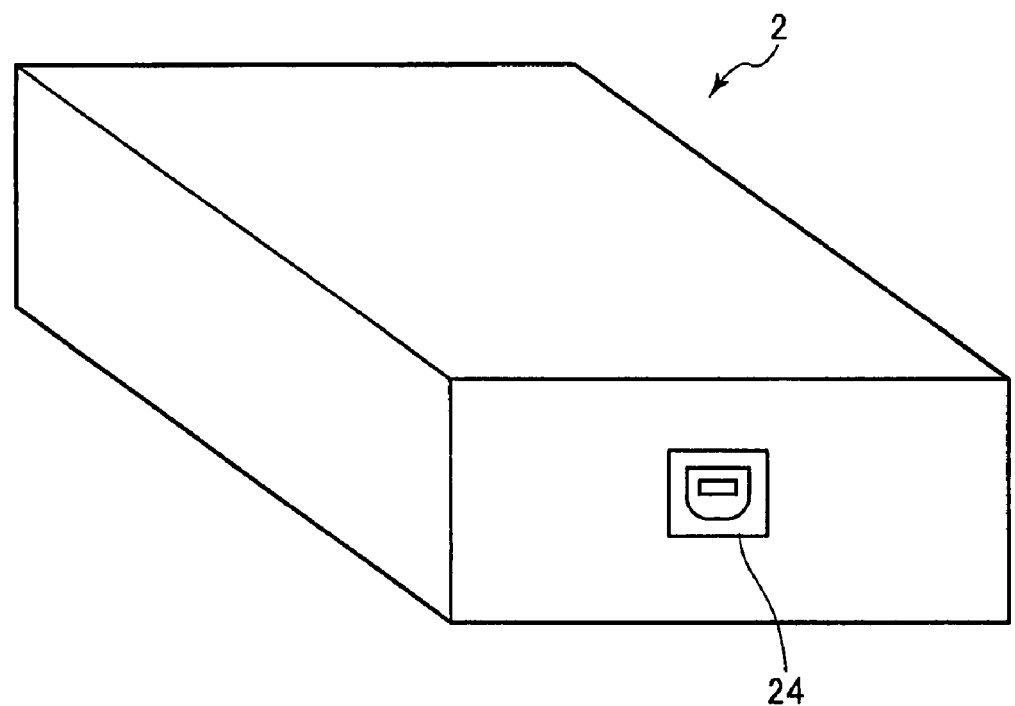
FIG. 1B is a perspective view showing the multi-reader/writer in FIG. 1A from the rear side.
Figure 2:
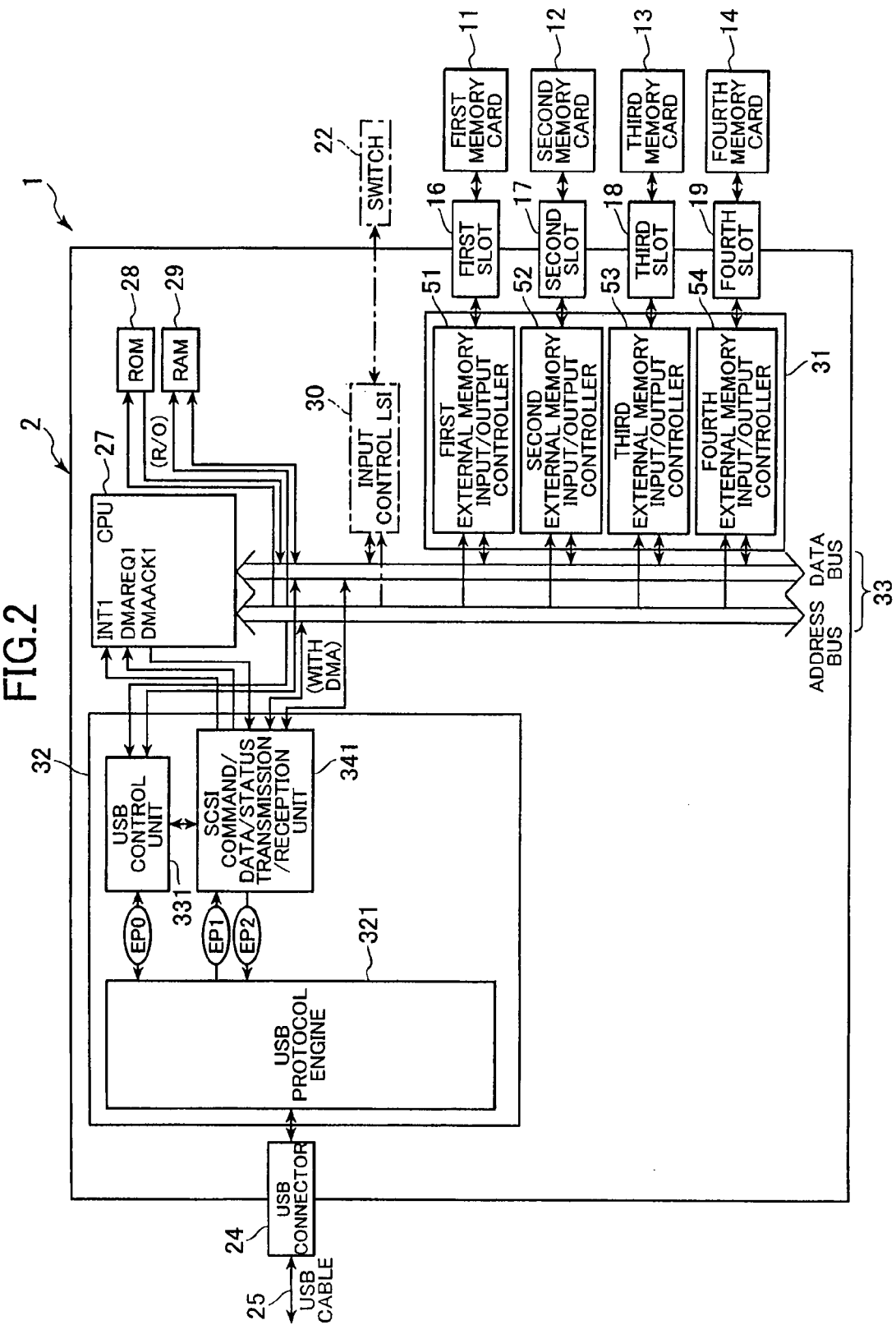
FIG. 2 is a block diagram showing the electrical structure of the multi-reader/writer.
Figure 6:
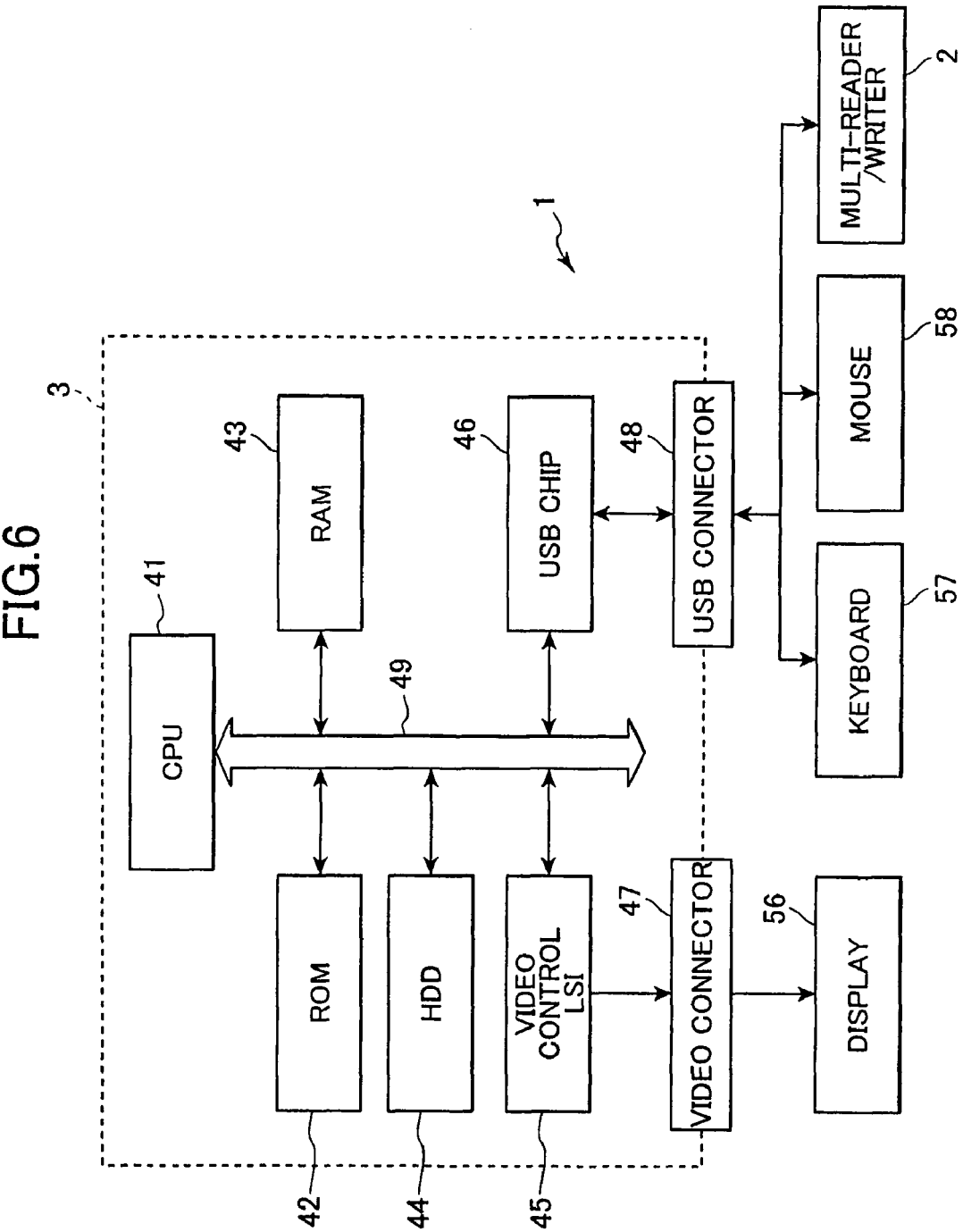
FIG. 6 is a block diagram showing the general structure of a personal computer employed in the communication system according to the embodiment.

A communication system 1 in the embodiment will be described in greater detail while referring to the accompanying drawings. FIGS. 1A and 1B are perspective views of a multi-reader/writer 2 employed in the communication system 1 as a storage device (an example of the peripheral device). FIG. 2 is a block diagram showing the general structure of the multi-reader/writer 2. FIG. 6 is a block diagram showing the general structure of a personal computer 3 employed in the communication system 1 as a host device.

As shown in FIG. 1A, the multi-reader/writer 2 is provided with various slots in the front surface thereof for detachably mounting card-type storage media. The slots provided in the multi-reader/writer 2 include a first slot 16 for inserting a first memory card 11 (such as the CF), a second slot 17 for inserting a second memory card 12 (such as the SM), a third slot 18 for inserting a third memory card 13 (such as the MS), and a fourth slot 19 for inserting a fourth memory card 14 (such as the SD). While the embodiment uses the multi-reader/writer 2 as an example of the peripheral device, the invention may also apply to a single-slot reader/writer. Further, when using disc storage media, such as a CD-ROM, DVD-ROM, or removable hard disk in place of the CF, SM, or other memory cards, a peripheral device called a changer drive is employed. The changer drive has an insertion section for inserting one or a plurality of disc storage media. The invention may be applied to a communication system having this type of peripheral device.

The multi-reader/writer 2 is configured of a USB/SCSI peripheral device. As shown in FIGS. 1B and 2, a USB connector 24 is provided on the rear surface of the multi-reader/writer 2 for connecting a USB cable 25. The communication system 1 of the embodiment employs SCSI-2 as the communication protocol. As shown in FIG. 2, the multi-reader/writer 2 houses a CPU 27 for controlling the various components of the multi-reader/writer 2, a ROM 28 for storing control programs and various data, a RAM 29 serving as a work area for computations performed by the CPU 27, an LSI 31 for controlling input and output, and a USB chip 32. These components are connected via a bus 33 and are capable of transferring data to each other. The multi-reader/writer 2 performs data communications with the personal computer 3 connected to the multi-reader/writer 2 according to SCSI protocol. Depending on the type of the multi-reader/writer 2, a switch 22 is provided for setting a priority among the first through fourth slots 16-19. The switch 22 is connected to the bus 33 via an input control LSI 30.

More specifically, the ROM 28 stores a communication control program created based on the SCSI protocol, and a table list of analytical data used for analyzing Command Descriptor Block (CDB) data received from the personal computer 3. The CPU 27 performs a control process for implementing a communication event corresponding to received SCSI commands in order that the multi-reader/writer 2 can function as the target of a SCSI compliant device. The first through fourth memory cards 11-14 detachably mounted in the first through fourth slots 16-19 are storage media with flash memory, such as the CompactFlash, Smart-Media, Memory Stick, and SD Cards described above. The personal computer 3 can access these cards in the form of data reading, writing, rewriting, and deleting and can confirm when the medium is mounted in the slot.

In compliance with SCSI protocol, the personal computer 3 functioning as the host device is given authority as the initiator for starting communication events, while the multi-reader/writer 2 connected to the personal computer 3 functions as the target of communications performed by the personal computer 3. The personal computer 3 issues a sequence of SCSI commands to the multi-reader/writer 2 for executing the communication event, and the multi-reader/writer 2 receives these commands, sequentially executes data processes corresponding to the SCSI commands, and returns response information to the personal computer 3 based on the execution results. The direction in which SCSI commands are issued is restricted to a one-way direction from the personal computer 3 to the multi-reader/writer 2.

The LSI 31 is provided with first through fourth external memory input/output controllers 51-54. The USB chip 32 includes a SCSI command/data/status transmission/reception unit (hereinafter simply referred to as a "transmission/reception unit") 341 provided commonly for each of the first through fourth external memory input/output controllers 51-54, a USB protocol engine 321 connected to the USB connector 24, and a USB control unit (control command unit) 331 for controlling transfer processes.

Here, the USB protocol engine 321 and USB control unit 331 constitute a communication controller, and the communication controller and USB connector 24 constitute a serial communication unit.

The USB control unit 331 is connected to the USB protocol engine 321 via a bi-directional endpoint EP0 configured of FIFO memory. The transmission/reception unit 341 is connected to the USB protocol engine 321 by separate input/output paths via an input endpoint EP2 formed of FIFO memory for inputting data into the USB protocol engine 321, and an output endpoint EP1 formed of FIFO memory for receiving data from the USB protocol engine 321.

The communication controller configured of the USB protocol engine 321 and USB control unit 331 receives, from the personal computer 3, identification information identifying the transmission/reception unit 341 and identification information identifying the endpoint corresponding to the transmission/reception unit 341. By polling the transmission/reception unit 341 as a target device, the communication controller identifies which of the first through fourth external memory input/output controllers 51-54 is the destination of the data access and the direction of data transmission/reception. Obviously, the USB protocol does not allow the transmission/reception unit 341, which is the target device, to poll the personal computer 3, which is the host device.

The transmission/reception unit 341 exchanges data with the USB protocol engine 321 according to the SCSI protocol. Elements that are transferred during these exchanges include SCSI commands identifying the details of a communication event, which are exchanged with the personal computer 3 via a USB bus, and response information (status) that the peripheral device returns after executing processes in a communication event. Further, if the process identified by the SCSI command is a data access process involving the transmission or reception of data stored on a memory card, then the data also becomes a transfer element.

Figure 3:
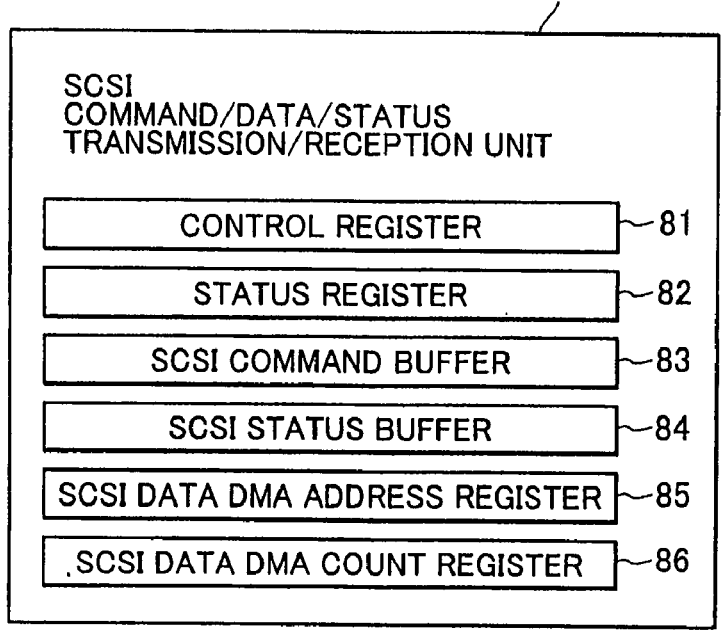
FIG. 3 is an explanatory diagram showing a SCSI command/data/status transmission/reception unit in the multi-reader/writer.
Figure 4:
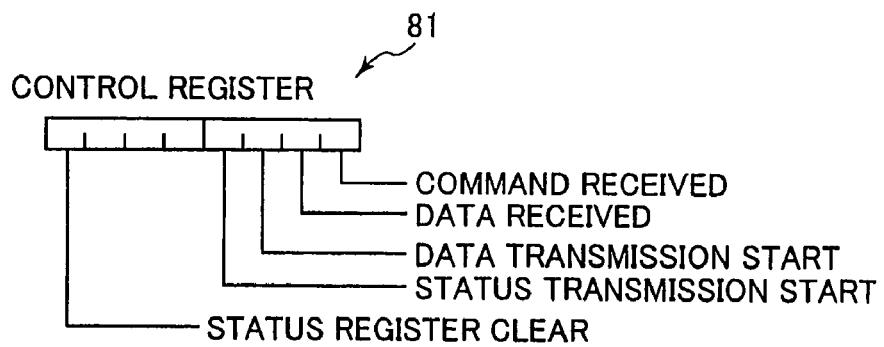
FIG. 4 is an explanatory diagram showing the configuration of a control register.
Figure 5:
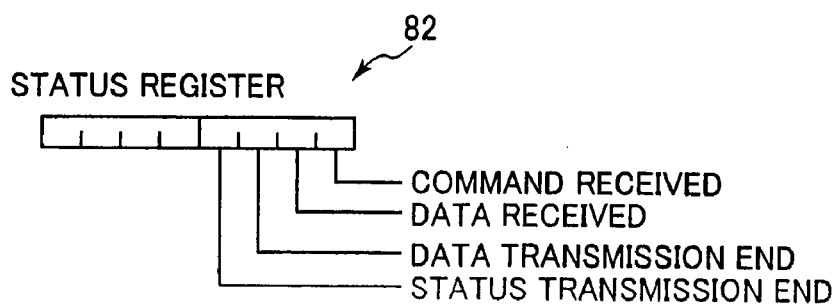
FIG. 5 is an explanatory diagram showing the configuration of a status register.

As shown in FIG. 3, the transmission/reception unit 341 has a control register 81 (shown in detail in FIG. 4), a status register 82 (shown in detail in FIG. 5), a SCSI command buffer 83, a SCSI status buffer 84, a SCSI data DMA address register 85, and a SCSI data DMA count register 86. The registers and buffers are described in greater detail below.

The CPU 27 sequentially executes a command analysis step for analyzing a SCSI command received from the transmission/reception unit 341, an event execution step for executing a communication event identified in the SCSI command in cooperation with the target external memory input/output controller 51-54 (or the plurality of logical units included in the multi-reader/writer 2 when the multi-reader/writer 2 is the target), and a status transmission step for transmitting a status to the transmission/reception unit 341.

An interrupt port INT1 in FIG. 2 is a port for executing interrupt processes in the CPU 27. Further, DMA (Direct Memory Access) is hardware configuration that enables high-speed data transfer without controls by CPU. In a normal state, the CPU 27 controls DMA communications.

DMAREQ1 (FIG. 2) is a DMA Request signal that the transmission/reception unit 341 requests permission from the CPU 27 for temporarily occupying the DMA communications. DMAACK1 (FIG. 2) is a DMA Acknowledge signal that the CPU 27 notifies the transmission/reception unit 341, upon receiving the DMA Request signal, of acknowledging permission for temporarily occupying the DMA communications. When the DMA communications end, the transmission/reception unit 341 notifies the CPU 27 of the end of the DMA communications through the interrupt port INT1.

Note that signal lines for addresses are normally unidirectional which is from the address bus to each controller. However, the signal line between the transmission/reception unit 341 and the address bus 33 is bidirectional as indicated as "WITH DMA" in FIG. 2. In contrast, signal lines for data are normally bidirectional. However, the signal line between the ROM 28 and the data bus 33 is unidirectional as indicated as "R/O" (read only) because the ROM 28 only accepts reading of data.

When performing a data read/write access on a memory card inserted in the multi-reader/writer 2, the multi-reader/writer 2 allocates a memory area used for reading data from the memory card or a memory area used for writing data on the memory card. The data length of the allocated memory area is referred to as the allocation length. Normally, the allocation length is set to the length specified by the personal computer 3 accessing the multi-reader/writer 2, but in the embodiment the maximum allocation length that can be set in the multi-reader/writer 2 is less than the maximum value that can be specified by the personal computer 3.

As shown in FIG. 6, the personal computer 3 includes a CPU 41 for controlling the various components of the personal computer 3, a ROM 42, a RAM 43, a hard disk drive (HDD) 44 for storing various software programs and data, a video control LSI 45, a USB chip 46, a video connector 47, and a USB connector 48 having a plurality of input/output ports, all of which components are connected via a bus 49 so as to be capable of transferring data to each other. These components are integrally incorporated in a main control circuit board called the motherboard. A display 56 is connected to the video connector 47 via a video cable. The USB connector 48 functions as a USB hub for connecting input devices, such as a keyboard 57 and a mouse 58, as well as the multi-reader/writer 2.

The ROM 42 stores data to be transmitted to the multi-reader/writer 2 and instruction data instructing the CPU 27 of the multi-reader/writer 2 to execute a predetermined process. The instruction data is stored as a table list in the HDD 44 or ROM 42. The HDD 44 stores Windows 2000 (hereinafter abbreviated as Win2000) Service Packet 3 (hereinafter abbreviated as SP3) as the operating system of the personal computer 3, and software programs, such as a read/write application for reading data from or writing data to the multi-reader/writer 2 in a special area for storing programs. The CPU 41 reads these software programs from the HDD 44 and performs predetermined computational processes, enabling each of the applications to run on the personal computer 3. The program storing region of the HDD 44 also stores a data communication program for performing data communications with the multi-reader/writer 2 according to SCSI protocol. While the personal computer 3 of the embodiment runs on the Win2000 platform, the personal computer 3 may also run a different OS, such as the Linux series, or the Mac OS series, and SP3 may be replaced with SP4 or Windows XP (registered trademark).

The read/write application described above, the data communication program on the personal computer 3, and the control program on the multi-reader/writer 2 work in cooperation to implement the following functions.

Search-instruction-data transmitting unit: provided in the personal computer 3 for issuing a search request command to the multi-reader/writer 2 requesting that the multi-reader/writer 2 perform a search report process on itself, for creating search instruction data having a predetermined frame format specifying details of the search report instructions and including supplementary information written to a predetermined field in the frame, and for sending the search instruction data to the multi-reader/writer 2 when issuing the search request command.

Search-report-data generating unit: provided in the multi-reader/writer 2 for receiving search instruction data and generating search report data having a predetermined frame format.

Search-report-data transmitting unit: provided in the multi-reader/writer 2 for transmitting search report data to the personal computer 3 as response information.

Supplementary-information extracting unit: provided in the multi-reader/writer 2 for extracting supplementary information from the predetermined field in the received search instruction data.

The above functions construct a supplementary-information communication mechanism.

The following functions are implemented with the supplementary-information communication mechanism.

Security-reference-information transmitting unit: for transmitting security reference information acquired on the personal computer 3 to the multi-reader/writer 2 as supplementary information in the search instruction data.

As will be described below, the multi-reader/writer 2 has an authentication unit for authenticating access privileges of the personal computer 3 for accessing the storage medium. Authentication is performed using security master information written in the storage medium and the security reference information received from the personal computer 3.

Authentication communicating unit: for transmitting authentication-result request information to the multi-reader/writer 2 as supplementary information in the search instruction data requesting authentication-result reflecting information reflecting the authentication results obtained by the authentication unit, and for returning search report data from the multi-reader/writer 2 to the personal computer 3 with the authentication-result reflecting information written in a predetermined frame of the search report data as supplementary response information in response to the supplementary information received from the personal computer 3.

The personal computer 3 has an authentication-result reflecting-information outputting unit for outputting the authentication-result reflecting information.

Access-mode-report communicating unit: for transmitting access-mode-report instruction information to the multi-reader/writer 2 as supplementary information in the search instruction data requesting that the multi-reader/writer 2 report the type of access mode set therein, and for returning search report data from the multi-reader/writer 2 to the personal computer 3 as response information having access-mode report information written in a predetermined frame of the search report data reporting the access mode currently set by an access-mode setting unit as supplementary response information in response to the supplementary information received from the personal computer 3.

The personal computer 3 has an access-mode-type displaying unit for displaying the type of access mode acquired through the access-mode-report communicating unit.

Normal-mode-shift-instruction-information transmitting unit: for transmitting normal-mode-shift-instruction information to the multi-reader/writer 2 as supplementary information in the search instruction data instructing the multi-reader/writer 2 to shift into the normal mode when the normal mode has been selected on the personal computer 3 side.

Normal-mode-setting-complete-report-information returning unit: for returning to the personal computer 3 normal-mode-setting-complete report information, as supplementary response information in response to the supplementary information received from the personal computer 3, in a predetermined frame of the search report data reporting that the normal mode has been set, when the multi-reader/writer 2 having received the normal-mode-shift-instruction information sets the access mode to the normal mode with an access-mode setting unit.

The personal computer 3 is further provided with an access-mode setting unit for setting the access mode to either the normal mode or the security mode, an inputting unit for inputting security reference information, and an input controlling unit for receiving security reference information inputted via the inputting unit when the security mode has been selected. The security-reference-information transmitting unit transmits the inputted security reference information to the multi-reader/writer 2 as supplementary information in the search instruction data.

Figure 7:
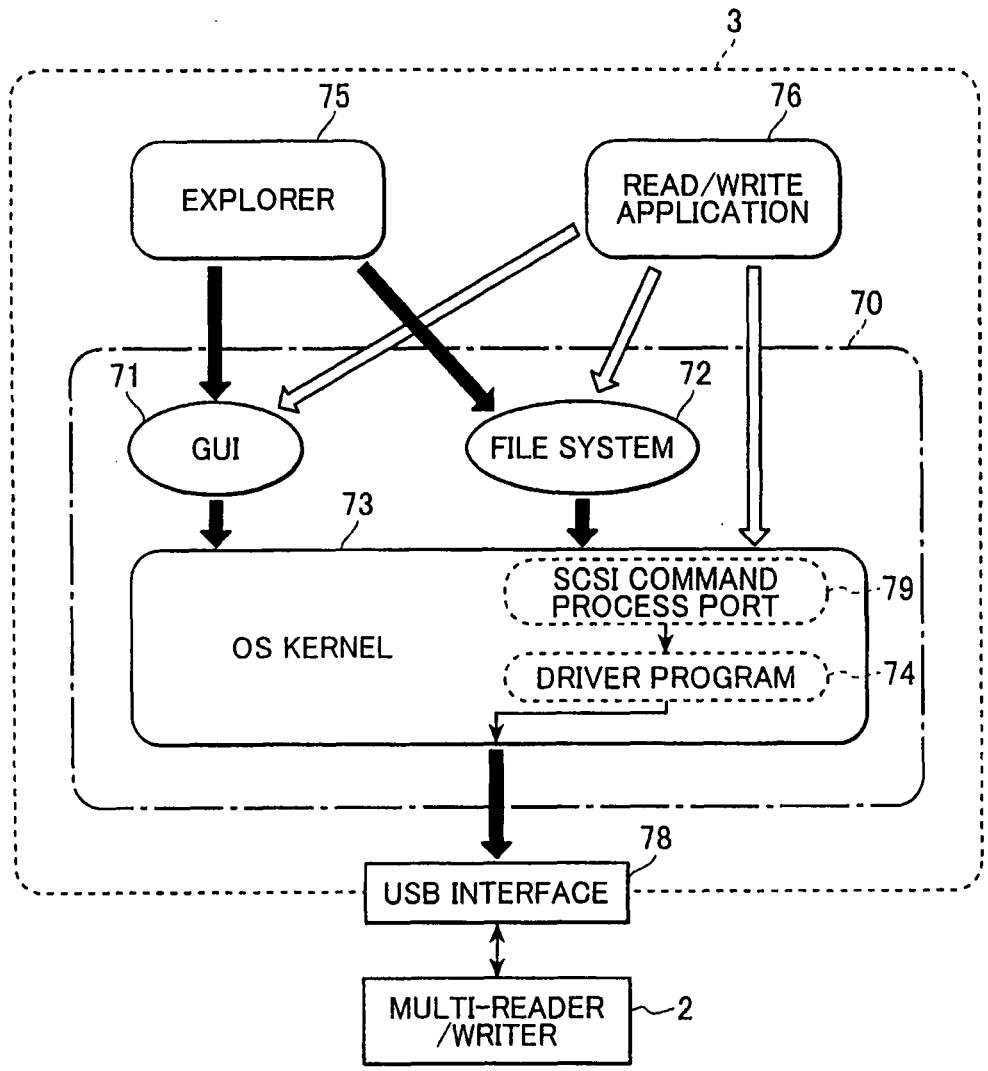
FIG. 7 is a block diagram illustrating an operating system running on the personal computer and an application running on the operating system.

Next, an overview of data communications performed between the personal computer 3 and the multi-reader/writer 2 based on SCSI commands will be described with reference to FIG. 7. Here, the multi-reader/writer 2 is connected to the personal computer 3 via a USB interface 78. The core system of the personal computer 3 is configured of an operating system (OS) 70 that includes a graphical user interface (GUI) 71, a file system 72, and an OS kernel 73. The GUI 71 is a user interface that uses computer graphics and allows the user to perform input operations using a mouse or other pointing device in relation to the graphics. The file system 72 is a system for managing data on the computer using files and folders. The OS kernel 73 is software provided with basic functions for monitoring applications and peripheral devices, for example. A driver program 74 has also been installed on the personal computer 3 for allowing the multi-reader/writer 2 to be accessed from the personal computer 3. The driver program 74 is installed as a module in the OS kernel 73.

Explorer 75 and a read/write application 76 running on the personal computer 3 are examples of applications used to access the multi-reader/writer 2. Explorer 75 is well known in the art as part of Microsoft's operating system used to manage files and folders. Explorer 75 is designed based on the OS 70 and is generally recognized as a function of the OS 70. Hence, Explorer 75 communicates with the multi-reader/writer 2 via the file system 72. The read/write application 76 is an independent application developed by the manufacturer of the multi-reader/writer 2, for example, and functions to perform processes for reading data from and writing data to storage media inserted in the multi-reader/writer 2.

First, the case of Explorer 75 accessing the multi-reader/writer 2 will be described. When the OS 70 and Explorer 75 are running, Explorer 75 issues an Inquiry command to the OS kernel 73 via the file system 72. All SCSI commands including the Inquiry command are issued to a SCSI command process port 79 provided virtually in the OS kernel 73.

When the Inquiry command is issued, the corresponding CDB (CDB(0) shown in Table 2 in this case) is transmitted to the multi-reader/writer 2. The multi-reader/writer 2 creates inquiry data (the S/I data shown in Table 3) and returns this data to the personal computer 3 as response information. The inquiry data includes configuration data, such as the model or device name of the multi-reader/writer 2, the SCSI-ID, the existence of a logical unit number (LUN), and the type of memory card. Based on this information, the personal computer 3 can recognize the multi-reader/writer 2.

When the personal computer 3 recognizes the multi-reader/writer 2, the GUI 71 generates an icon in Explorer 75 indicating the multi-reader/writer 2 as a drive. If the user accesses the drive icon using the mouse or the like and inputs an instruction to read data, the Explorer 75 activates the file system 72 to issue a Read command (an example of a SCSI command) to the OS kernel 73. Similarly, if the user inputs an instruction to write data, the Explorer 75 activates the file system 72 to issue a Write command (an example of a SCSI command) to the OS kernel 73. The OS kernel 73 transfers this command data to the multi-reader/writer 2 via the USB interface 78 and the like so that a read or write operation is executed on the multi-reader/writer 2 depending on the command. Explorer 75 issues the Inquiry command when the multi-reader/writer 2 is connected to the personal computer 3 or if the personal computer 3 is restarted while the multi-reader/writer 2 is connected to the personal computer 3.

Next, an example of the read/write application 76 accessing the multi-reader/writer 2 will be described. When started, the read/write application 76 issues a request to the OS kernel 73 to open a data bus just for the read/write application 76. Upon receiving this command, the OS kernel 73 appropriates a data bus to the read/write application 76. Consequently, SCSI commands issued from the file system 72 to the SCSI command process port 79 are not accepted by the SCSI command process port 79. Hence, while the read/write application 76 is running, the file system 72 cannot access the multi-reader/writer 2. Further, when the read/write application 76 is started, the GUI 71 displays an input window (user interface window) programmed in the read/write application 76 on a display of the personal computer 3. The driver program 74 issues an Inquiry command to the OS kernel 73 and acquires configuration data, such as the model or device name of the multi-reader/writer 2, in inquiry data returned as response information (the S/I data shown in Table 3 in this case). In this way, the personal computer 3 can recognize the multi-reader/writer 2. Subsequently, data reading or writing is performed on the multi-reader/writer 2 based on a Read command or Write command that the driver program 74 outputs to the OS kernel 73.

The personal computer 3 recognizes the multi-reader/writer 2 in the following manner. First, the personal computer 3 transmits to the multi-reader/writer 2 the CDB (0) (see Table 2) generated when the Inquiry command has been issued to the OS kernel 73. Upon receiving the CDB (0), the multi-reader/writer 2 references various information included in the CDB (0), generates configuration information corresponding to this data, and transmits S/I data (see Table 3) including this configuration information to the personal computer 3. The personal computer 3 then recognizes the multi-reader/writer 2 based on the S/I data received from the multi-reader/writer 2.

If a memory card is replaced (i.e., if the event or status changes) in one of the slots (or external memory input/output controllers, i.e. logical units) in the multi-reader/writer 2, the multi-reader/writer 2 generates a unit attention condition for notifying the personal computer 3. The file system of the personal computer 3 references the unit attention condition and recognizes that a memory card has been exchanged, and subsequently updates the file information in the file allocation table (FAT) or the like. If an Inquiry command is issued to the logical unit holding this unit attention condition, the logical unit executes the Inquiry command without clearing the unit attention condition. In other words, the notification information for the memory card exchange reflected in the unit attention condition is preserved when executing an Inquiry command. Accordingly, the file system of the personal computer 3 can access the exchanged memory card without problem.

Next, more detailed operations of the multi-reader/writer 2 will be described with reference to the flowchart in FIG. 8. The following description covers the process performed for only one slot, but the process can be performed in parallel on a plurality of slots using an interrupt process. In step T1 in the process of FIG. 8, the CPU 27 performs an initialization process when the power of the multi-reader/writer 2 is turned on, i.e., when the personal computer 3 supplies electricity to the multi-reader/writer 2 via a USB cable (bus power). Subsequently, in T2 the multi-reader/writer 2 enters a state allowing interrupts from the USB chip 32. Commands that the personal computer 3 transmits to the USB chip 32 over the USB cable 25 are relayed to the transmission/reception unit 341 through operations of the USB protocol engine 321 and USB control unit 331. At this time, the multi-reader/writer 2 does not yet return a response indicating that the command has been received.

Upon receiving a command, the transmission/reception unit 341 sets a "command received" bit in the status register 82 to "1" for generating an interrupt in the CPU 27. At this time, the CPU 27 can reference the status register 82 to determine the purpose of the interrupt. The multi-reader/writer 2 also stores the received command in the SCSI command buffer 83.

When the CPU 27 detects an interrupt (T3: YES), then if reception of the SCSI command is completed (T4: YES), in T5 the CPU 27 interprets the command received by the transmission/reception unit 341. Specifically, when the CPU 27 determines that the transmission/reception unit 341 has received a command by referencing the status register 82 in the transmission/reception unit 341, the CPU 27 acquires the command from the SCSI command buffer 83 and interprets the command. In this operation, the CPU 27 can learn of the existence, transfer direction, and size of the SCSI data.

If the CPU 27 learns that there is no SCSI data (in an Inquiry command or a Test Unit Ready command, for example) and when the transfer direction for the SCSI data is from the device to the personal computer (transmission; in a Read command, for example; T6: YES), then in T7 the CPU 27 writes a "1" to each of the "command received" bit and a "status register clear" bit in the control register 81 of the transmission/reception unit 341.

When a "1" is written to the "command received" bit in T7, the transmission/reception unit 341 returns a response to the personal computer 3 indicating that a command has been received. Upon receiving this response, the personal computer 3 enters a device wait state for receiving a SCSI status in the case of no SCSI data or for receiving SCSI data when the transfer direction of the data is from the device to the PC.

On the other hand, if the CPU 27 learns that the transfer direction of the SCSI data is from the PC to the device (reception; in a Write command, for example; T6: NO), then in T8 the CPU 27 prepares to receive SCSI data from the personal computer 3. Specifically, the CPU 27 allocates area in the RAM 29 sufficient for receiving the SCSI data, writes the top address of the allocated area in the SCSI data DMA address register 85, and writes the number of bytes to be received in the SCSI data DMA count register 86. In T9 the CPU 27 writes a "1" to the "command received" bit and the "status register clear" bit in the control register 81 of the transmission/reception unit 341.

When a "1" is written to the "command received" bit in T9, the transmission/reception unit 341 returns a response to the personal computer 3 indicating that a command has been received. Upon receiving this response, the personal computer 3 recognizes that the multi-reader/writer 2 has interpreted the command and is prepared to receive SCSI data. Accordingly, the personal computer 3 begins to transmit SCSI data.

When the value stored in the SCSI data DMA count register 86 has reached 0 during the data transfer process, the transmission/reception unit 341 sets a "data received" bit in the status register 82 to "1" for generating an interrupt in the CPU 27.

When the interrupt is generated (T10: YES), the CPU 27 writes a "1" to the "data received" bit and the "status register clear" bit in the control register 81 of the transmission/reception unit 341 and ends the reception process for SCSI data (T11: YES). At this time, the personal computer 3 is notified that the SCSI data has been transferred to the multi-reader/writer 2 and shifts to the device wait state for receiving the SCSI status.

After completing step T7 and after a YES determination in T11, the CPU 27 executes the command in T12. If the command is a Test Unit Ready command, for example, the CPU 27 determines whether the first through fourth memory cards 11-14 are inserted in the corresponding slots. If the command is a Read command, for example, the CPU 27 reads data from the first through fourth memory cards 11-14. If the command is a Write command, for example, then the CPU 27 writes the data received from the personal computer 3 in T8-T11 described above to the first through fourth memory cards 11-14.

Next, if the transfer direction for the SCSI data is from the device to the personal computer (transmission; in a Read command, for example; T13: YES), then in T14 the CPU 27 prepares to transmit data to the personal computer 3. More specifically, the CPU 27 allocates an area of the RAM 29 sufficient for transmitting the data, stores the read data in the allocated area, writes the top address of the allocated area in the SCSI data DMA address register 85, and writes the number of bytes for transmission to the SCSI data DMA count register 86. Subsequently, the CPU 27 writes a "1" to a "data transmission start" bit in the control register 81 of the transmission/reception unit 341.

When the "1" is written to the "data transmission start" bit in T14, the transmission/reception unit 341 begins transferring SCSI data to the personal computer 3. After transfer of the SCSI data is complete, the transmission/reception unit 341 sets a "data transmission end" bit in the status register 82 to "1" for generating an interrupt in the CPU 27.

When an interrupt is generated (T15: YES), the CPU 27 learns that the SCSI data transfer is complete. Accordingly, the CPU 27 writes a "1" to the "status register clear" bit in the control register 81 of the transmission/reception unit 341 and ends the SCSI data transmission (T16: YES).

After a NO determination in T13 and after a YES determination in T16, the CPU 27 begins transmitting SCSI data in T17. More specifically, since the CPU 27 already determined the status to be returned to the personal computer 3 in the above process, the CPU 27 writes this status in the SCSI status buffer 84, writes a "1" in a "status transmission start" bit in the control register 81 of the transmission/reception unit 341, and begins transmitting the SCSI status.

When a "1" is written to the "status transmission start" bit in T17, the transmission/reception unit 341 begins transmitting the SCSI status to the personal computer 3. After a response indicating that the SCSI status is received from the personal computer 3, the transmission/reception unit 341 sets the "status transmission end" bit in the status register 82 to "1" for generating an interrupt in the CPU 27.

When an interrupt is generated (T18: YES), the CPU 27 learns that the SCSI status transmission has ended. Accordingly, the CPU 27 writes a "1" to the "status register clear" bit in the control register 81 of the transmission/reception unit 341, and ends the SCSI data transmission (T19: YES). As a result, the status register 82 of the transmission/reception unit 341 is cleared in T20 and returned to the original state.

Figure 9:
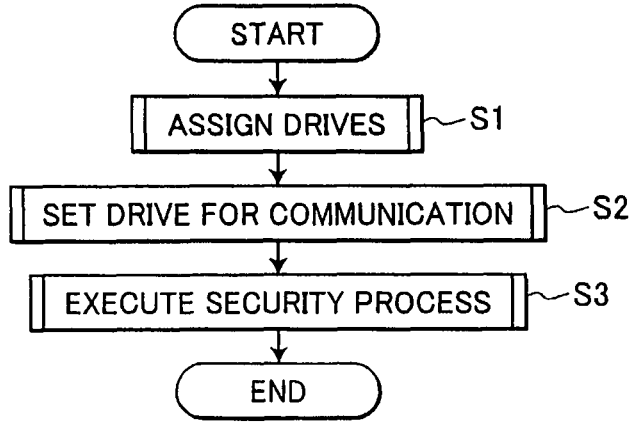
FIG. 9 is a flowchart illustrating steps in a data communication process performed with the communication system.

Next, an example of steps in a data communication process performed by the communication system 1 using inquiry data will be described. The CPU 41 of the personal computer 3 and the CPU 27 of the multi-reader/writer 2 control their corresponding components to execute each of the steps in this process. FIG. 9 is a flowchart illustrating steps in the primary process. Specifically, when the multi-reader/writer 2 is connected to the personal computer 3 and power is turned on for each device, in S1 the CPU 41 executes a drive assignment process for assigning a drive to the unknown device connected to the personal computer 3. Since the multi-reader/writer 2 is the only device connected to the personal computer 3 in the embodiment, the CPU 41 only assigns a drive for the multi-reader/writer 2.

Next, the personal computer 3 performs a drive setting process in S2 for setting a user-selected drive as the communication destination. When the drive is set, the personal computer 3 recognizes the device corresponding to the set drive (the multi-reader/writer 2 in the embodiment) as the communication destination. Next, a security process is executed in S3 on the first through fourth memory cards 11-14 inserted in the multi-reader/writer 2. The routine of the primary process is repeatedly executed at fixed intervals of 100-1000 ms (500 ms, for example) using a start trigger or the like outputted periodically from a start management timer routine.

FIG. 10 shows steps in the drive assignment process of S1 executed by the CPU 41 of the personal computer 3. In S101 of FIG. 10, the CPU 41 initializes the drive to be referenced (hereinafter referred to as the "reference drive") to Drive A. "Reference drive" denotes that the drive can be assigned by the personal computer 3. If a plurality of drives exists, the drives are referenced in ascending order during the drive assignment process. The OS kernel in Win2000 installed on the personal computer 3 manages the reference drive. In the embodiment, the personal computer 3 can assign a total of 26 drives, that is, Drives A-Z.

After setting the reference drive, in S102 the CPU 41 issues an Inquiry command (hereinafter referred to as an "Inq(0) command") to the reference drive requesting the device assigned to the drive to return S/I data. In reality, the CPU 41 issues the Inq(0) command to the OS kernel, and the OS kernel handles the Inq(0) command as a command to be issued to the reference drive. The OS kernel subsequently generates a CDB(0) in which the EVPD region is set to "0" and transmits the CDB(0) to the unknown device associated with the reference drive. According to the SCSI standard, S/I data should be returned when the EVPD region is set to "0". In the "value" column of Table 2, each entry is represented in hexadecimal form. Unless otherwise indicated in the following description, all values in these columns are represented in hexadecimal.

When a device associated with the reference drive exists and the device is capable of processing SCSI commands (a SCSI compliant device), the device returns S/I data. However, if a device does not exist or if the device cannot process SCSI commands (a non-SCSI compliant device), no S/I data is returned from a device. In S103 the CPU 41 determines whether an error has occurred based on whether S/I data has been returned. Specifically, the CPU 41 determines that an error has occurred if no S/I data has been returned (S103: YES). In this case, the CPU 41 jumps to S107. On the other hand, the CPU 41 determines that an error has not occurred when S/I data has been returned (S103: NO). In other words, the CPU 41 determines that a device associated with the reference drive exists. In this case, the CPU 41 advances to S104.

When the CPU 41 determines that no error occurred in S103, then in S104 the CPU 41 determines whether the device associated with the reference drive can be a communication target based on the returned S/I data. In other words, the CPU 41 determines whether the device can perform communications. This step is performed in the embodiment to determine whether the device associated with the reference drive is the multi-reader/writer 2. Further, in the embodiment, the multi-reader/writer 2 returns S/I data shown in Table 3 to the personal computer 3, and the CPU 41 performs the determination process of this step by determining whether data in bytes 0 and 1, the vendor ID in the region of bytes 8-15, the product ID in the region of bytes 16-31, and the like in the returned S/I data matches ID data and the like already stored on the personal computer 3. If the CPU 41 determines in this step that the device is capable of communications (S104: YES), then the CPU 41 advances to S106. If not (S104: NO), the CPU 41 jumps to S107. In Table 3, the data "0x00" for byte 0 denotes a direct access device; and the data "0x80" for byte 1 denotes a replaceable storage medium. Since each of the above bytes is defined in the SCSI standard, a more detailed description can be found by referring to the SCSI specifications.

In S106 the CPU 41 executes a process for adding the current reference drive to a corresponding drive list (assigned drive list). The corresponding drive list is a final list of reference drives for which drives have been assigned. More specifically, the corresponding drive list is stored in a predetermined storage area of the RAM 43, and the CPU 41 writes relevant reference drives to the storage area. Subsequently, the CPU 41 advances to S107.

In S107 the CPU 41 determines whether the reference drive is Drive Z. For example, drives may be counted in the order referenced in a counter memory or the like, and the CPU 41 can determine whether the current reference drive is Drive Z by monitoring this counter value. This determination is made to determine whether the set reference drive is the final drive. If the CPU 41 determines that the reference drive is Drive Z, then there are no more drives that can be referenced, and the CPU 41 advances to S109. However, if the reference drive is not Drive Z, then in S108 the CPU 41 sets the next drive in order as the reference drive and repeats the process described above from S102 until a YES determination is made in S107.

After advancing to S109, the CPU 41 assigns drives based on the corresponding drive list. This completes the drive assignment process of S1. Since only the multi-reader/writer 2 is connected to the personal computer 3 as an external storage device in the embodiment, the multi-reader/writer 2 is assigned to Drive A, while no other device exists to be assigned to another drive.

FIG. 11 shows the steps in the drive setting process of S2. In S201 of FIG. 11, the CPU 41 determines whether a drive assigned in the drive assignment process of S1 (hereinafter referred to as an "assigned drive") exists. In other words, the CPU 41 determines whether a predetermined device has been assigned to a drive that can be assigned on the personal computer 3. Since Drive A has been assigned to the multi-reader/writer 2 in the embodiment, the CPU 41 determines that an assigned drive exists. In S202 the CPU 41 determines whether there is only one assigned drive. However, if the CPU 41 determines that no assigned drive exists (S201: NO), then no communication target is present and the process ends.

If the CPU 41 determines in S202 that only one assigned drive exists (S202: YES), then in S205 the CPU 41 sets the assigned drive to the communication target. In other words, the CPU 41 sets the device associated with the assigned drive to the communication target. In the embodiment, Drive A is set as the communication target and, hence, the multi-reader/writer 2 is set as the device targeted for communications.

However, if the CPU 41 determines that a plurality of assigned drives exists (S202: NO), then in S203 the CPU 41 displays a dialog box with icons indicating the assigned drives and prompts the user to select one of the icons corresponding to the desired drive. When the desired assigned drive has been selected (S204: YES), then in S205 the CPU 41 sets the selected assigned drive as the communication target. If a priority has been set for the assigned drives, then the CPU 41 can automatically set the assigned drive having the highest priority as the communication target, even if one of the icons is not selected. Subsequently, the drive setting process of S2 ends.

Figure 15:
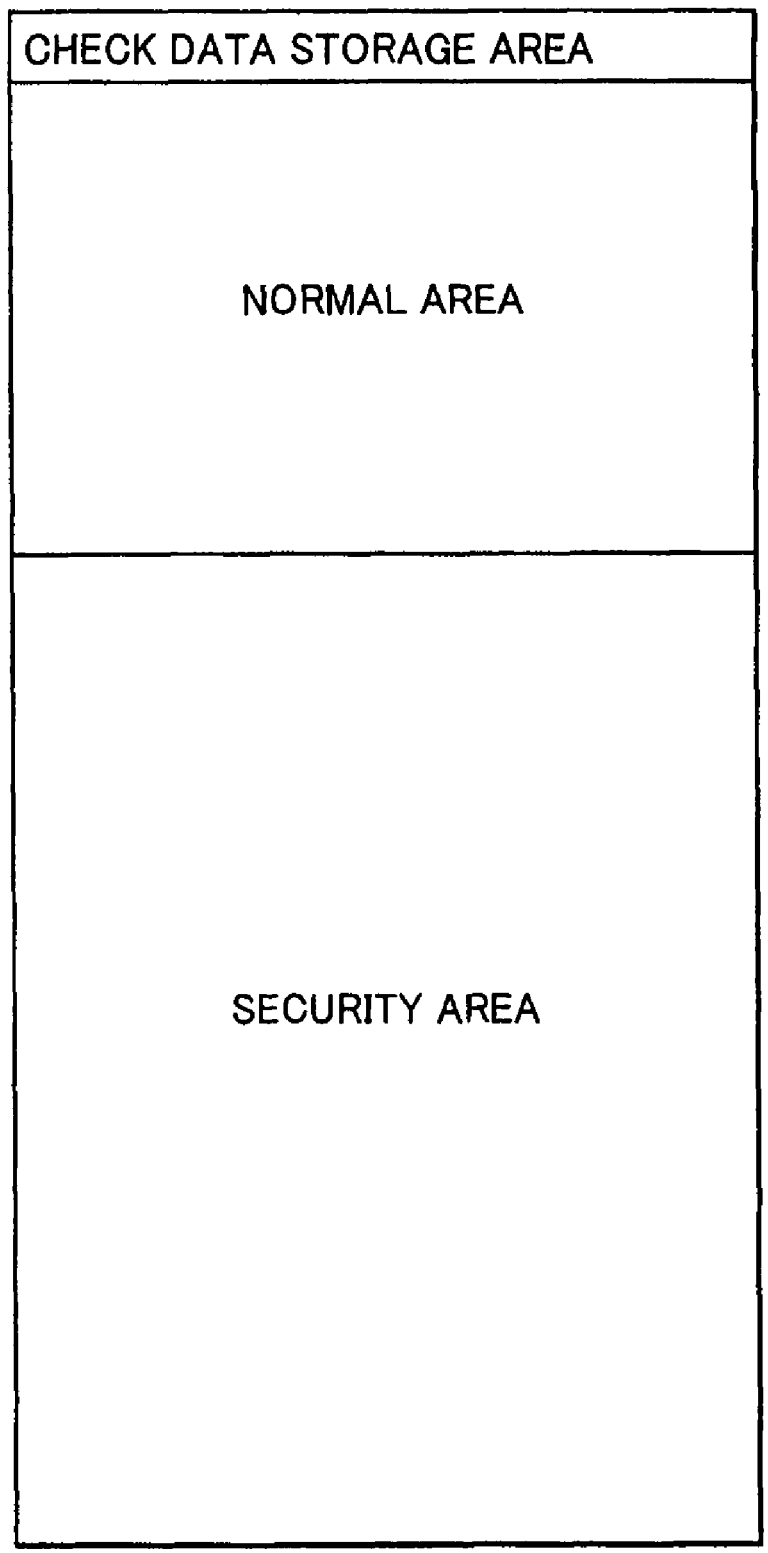
FIG. 15 is an explanatory diagram showing the memory area configuration of a memory card.

Next, the security process of S3 will be described. The ROM 28 of the multi-reader/writer 2 shown in FIG. 2 stores authentication firmware for implementing the authentication function (authenticating unit) described above. FIG. 15 shows a sample configuration of the storage area on a memory card. The storage area is divided into a normal area that can be accessed from the personal computer 3, even when the authentication function rejects authentication of access privileges, and a security area that can be accessed by the personal computer 3 only when the authenticating unit has accepted authentication of access privileges. Further, an access mode for accessing the storage medium can be set to one of either a normal mode allowing access to only the normal area, or a security mode allowing access to the security area. The authentication firmware performs a process for setting the access mode to the security mode only when authentication has been accepted.

Security reference information is a password used as an encryption key and is inputted via the keyboard 57 of the personal computer 3, for example. The multi-reader/writer 2, on the other hand, possesses original check data, which serves as the security master information. Specifically, original check data can be stored in the ROM 28, for example, as unique data. As shown in FIG. 15, a check data storage area has been allocated in the memory card. The original check data is encrypted using the above password as an encryption key and is written to the check data storage area as check data. Check target data is obtained by decoding the check data with the encryption key received from the personal computer 3 (i.e., a password that the user inputs on the personal computer 3). The authentication firmware accepts authentication when the check target data matches the original check data on the multi-reader/writer 2 (the security master information) and rejects authentication when the two do not match. When authentication is accepted, the user is allowed access to sectors in the security area (or in both the normal and security areas). When authentication is rejected, the user is allowed access to only sectors in the normal area. It is also possible to employ a simple format of writing the password itself directly to the memory card as the check data, rather than using the password as an encryption key for the unique original check data. In this case, the correct password is stored in the ROM 28 as the security master information and is used in verification. However, the user cannot set his own password because the password is stored in the ROM 28 in this case. In the embodiment, the check data is obtained by encrypting the fixed original check data in the ROM 28 using the user's password as the encryption key, and the encrypted check data is written to the memory card. Since the user's password is not written in the memory card, security can be improved.

Figure 12:
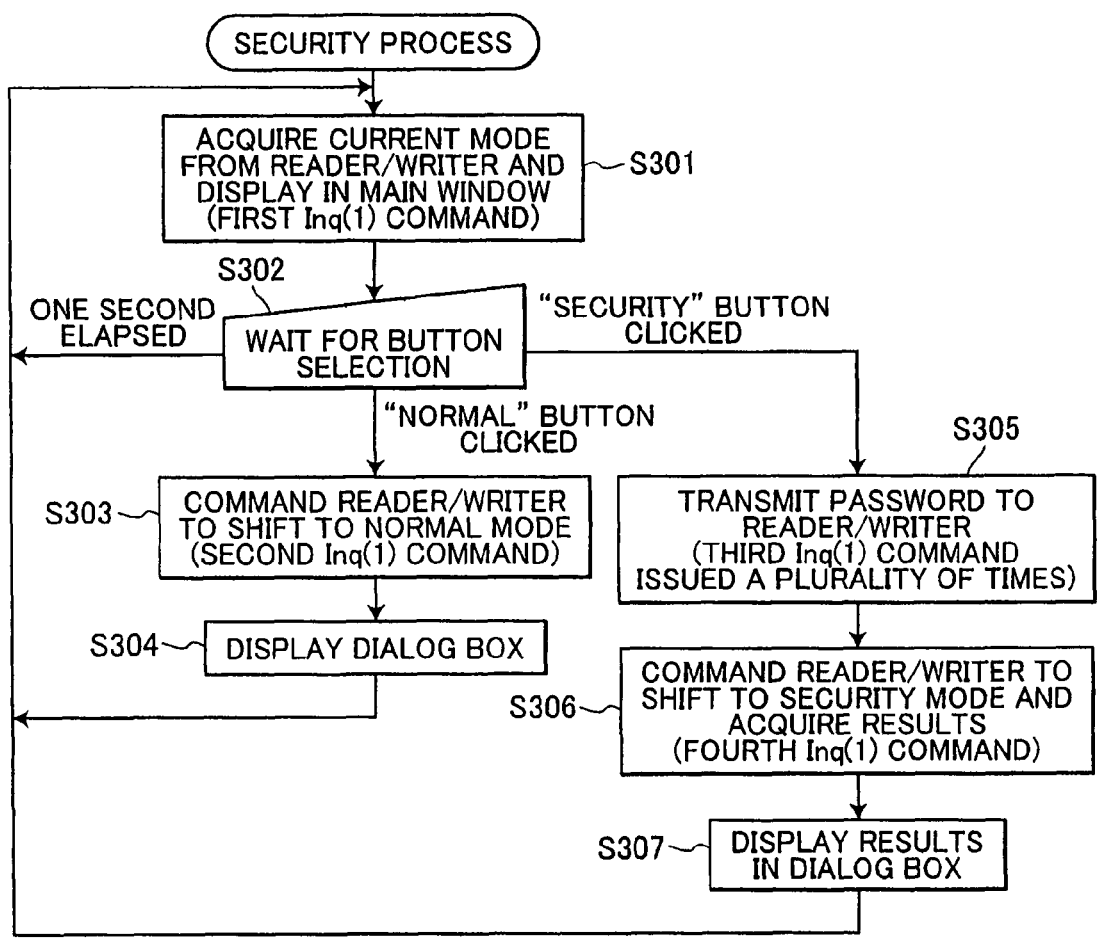
FIG. 12 is a flowchart illustrating steps in a security process of FIG. 9 executed on the personal computer.
Figure 13:
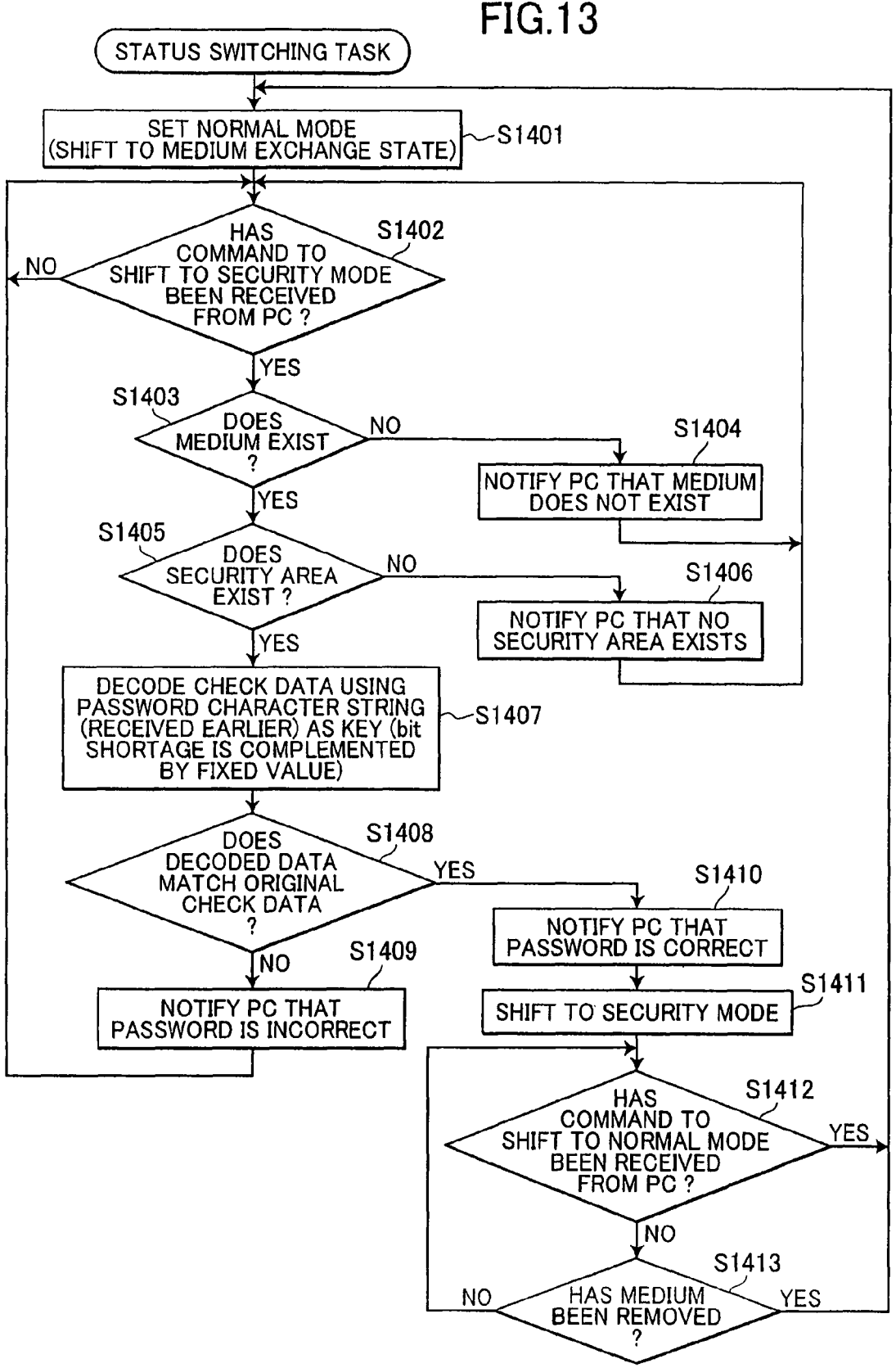
FIG. 13 is a flowchart illustrating steps in a status switching task executed by the multi-reader/writer in response to the process shown in FIG. 12.

FIG. 12 shows steps in the security process performed on the personal computer 3, while FIG. 13 shows steps in the security process performed on the multi-reader/writer 2. Beginning in S301 on the personal computer 3 side, the CPU 41 issues a first Inquiry command (hereinafter abbreviated as an "Inq(1) command" to Drive A requesting that the multi-reader/writer 2 return vital product data (VPD), which reports the current access mode setting. In reality, the CPU 41 issues the Inq(1) command to the OS kernel 73, and the OS kernel 73 handles issuance of the command to Drive A. When the Inq(1) command has been issued, the OS kernel 73 generates a CDB(1) in which the EVPD region is set to "1", and transmits the CDB(1) to the multi-reader/writer 2 associated with Drive A via the USB cable 25. Table 4 shows the CDB(1) generated at this time. Specifically, the region in byte 2 of the CDB(1) contains the page code descriptor "0xE0".

Byte 4 of the CDB(1), i.e., the allocation length region, holds "0x10" (or "00010000" in binary representation), for example. Originally, the allocation length region is used to store the allocation length described above. In the embodiment, the maximum allocation length in the multi-reader/writer 2 is set in advance to a fixed length (15 bytes is used in this example, but the invention is not limited to this length). This number "15" can be expressed by the low-order 4 bits. In accordance with the SCSI standard, the allocation length of the multi-reader/writer 2 is set to the above maximum value, i.e. 15 bytes, even when the allocation length is set to a value greater than the maximum value set in the multi-reader/writer 2. Hence, even if the allocation length region contains the value "0x10" or "0x11" or greater, the allocation length is set to 15 bytes. This is significant in that, if any of the high-order 4 bits in the allocation length region is "1", then the data in the allocation length region can be freely used as arbitrary data (supplementary information). Hence, by setting one of the high-order 4 bits to "1", all other bits in the allocation length region can be allocated as a virtual free region. Accordingly, arbitrary data can be added to this allocated region to exchange the aforementioned supplementary information between the personal computer 3 and multi-reader/writer 2.

The above allocation length need not always be set to a fixed length (15 bytes in the above example). The maximum value of the allocation length may be set based on the page code in the CDB(1). For example, the maximum value of the allocation length may be set to a fixed length of 15 bytes when the page code is "0xE0" and set to a fixed length of 9 bytes when the page code is "0xE2". The process for setting the maximum length is implemented as follows. The CPU 27 of the multi-reader/writer 2 reads the page code from the received CDB(1) and selects a fixed length corresponding to the content of the page code from a fixed length correlation list that has been stored in the ROM 28. Obviously, the allocation length can be set to any length in addition to 15 or 9 bytes.

Table 6 categorizes communication data included in the allocated space (the above-mentioned virtual free region) in the allocation length region. The description column in Table 6 describes what each data value denotes. Table 6 shows communication data transmitted when the page code is "0xE0". By changing the page code (information identifying the type of search instruction data) in the CDB (search instruction data), it is possible to generate different formats of different search instruction data with different maximum values for the allocation length and different supplementary information content.

TABLE 6

Page code: 0xE0

| Data in allocation region | Description |
|---|---|
| 0x00-0x0F (00000000)-(00001111) | Allocation length |
| 0x10 (00010000) | Mode request |
| 0x11 (00010001) | Normal mode shift request |
| 0x13 (00010011) | Security mode shift request |
| 0x20-0xFF (00100000)-(11111111) | Code indicating which character (n<sup>th</sup> character) in inputted password |

In Table 6, the actual data stored in the allocation length region is shown in the left columns, while a description of this data is provided in the right columns. When the personal computer 3 transmits data in the left column to the multi-reader/writer 2, the CPU 27 on the multi-reader/writer 2 extracts the data from the allocation length region of the CDB(1), analyzes the extracted data, and executes a process corresponding to the data content. The content shown in Table 6 is provided as a table list and stored in the HDD 44 or ROM 42 on the personal computer 3 and in the ROM 28 on the multi-reader/writer 2.

When the personal computer 3 issues the Inq(1) command in S301 described above, the generated CDB(1) has the supplementary information "0x10" in the allocation length region. Hence, the first Inq(1) command is a command issued from the personal computer 3 to the multi-reader/writer 2 requesting that the multi-reader/writer 2 return the current access mode (normal mode or security mode) as supplementary response information. Similarly, "0x11" is a command requesting the multi-reader/writer 2 shift to the normal mode, while "0x13" is a command requesting that the multi-reader/writer 2 shift to the security mode.

When the CDB(1) is received on the multi-reader/writer 2, the CPU 27 extracts the supplementary information "0x10" in the allocation length region of the CDB(1). The CPU 27 then performs a process to detect the access mode setting based on the supplementary information.

After detecting the access mode, the CPU 27 returns the detection results to the personal computer 3. Specifically, after receiving the CDB(1), the CPU 27 generates detection results and writes the detection results in the VPD to be returned to the personal computer 3. More specifically, the CPU 27 writes data reporting the access mode to byte 7 shown in Table 7. In the embodiment, the CPU 27 writes "0x00" when the access mode is the normal mode and "0x01" when the access mode is the security mode. Table 7 shows the VPD when the access mode is the normal mode. Similarly, byte 8 in Table 7 reports whether a shift to the normal mode is completed, while byte 9 reports whether a shift to the security mode is completed (for both, "0x00" indicates that the shift is not completed, and "0x01" indicates that the shift is completed).

TABLE 7

| | | VPD |
|---|---|---|
| Byte | Value | Remarks |
| 0 | 0x00 | Direct access device |
| 1 | 0xE0 | Page code |
| 2 | 0x00 | Reserved (fixed at 0) |
| 3 | 0x0B | 15 bytes (0-14) exist |
| 4 | Nn | Version information of device |
| 5 | 0x00 | Fixed at 0 |
| 6 | Nn | (Unused) |
| 7 | 0x00 | Mode report (0x00: normal mode, 0x01: security mode) |
| 8 | 0x01 | Normal mode shift report (0x00: not shifted, 0x01: shifted) |
| 9 | 0x00 | Security mode shift report (0x00: not shifted, 0x01: shifted) |
| 10-14 | nn | (Unused) |

Next, the personal computer 3 receives the VPD of Table 7 returned by the multi-reader/writer 2 and acquires the supplementary response information. The CPU 41 of the personal computer 3 determines the access mode set in the multi-reader/writer 2 by referencing byte 7 of the VPD, for example. The series of communication processes described above in which the personal computer 3 issues an Inq(1) command and transmits the CDB(1) including the supplementary information to the multi-reader/writer 2 and in which the multi-reader/writer 2 returns the VPD including the supplementary response information (information reporting results of mode selecting operation such as mode report, normal mode shift report, and security mode shift report described above) in response to the supplementary information from the personal computer 3 is referred to as an Inq(1)/VPD supplementary information communication.

Figure 14A:
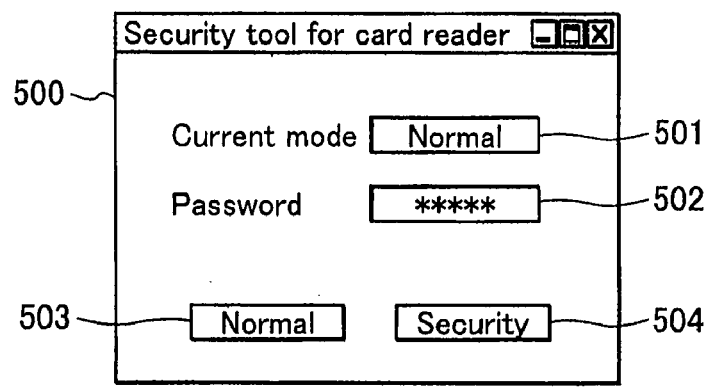
FIG. 14A is a screenshot of a first dialog box displayed by the personal computer.
Figure 14B:
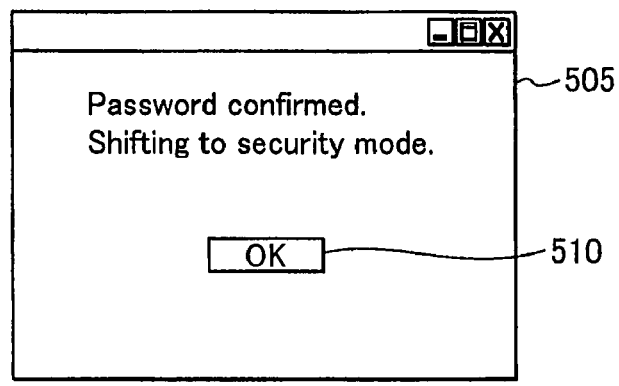
FIG. 14B is a screenshot of a second dialog box displayed by the personal computer.
Figure 14C:
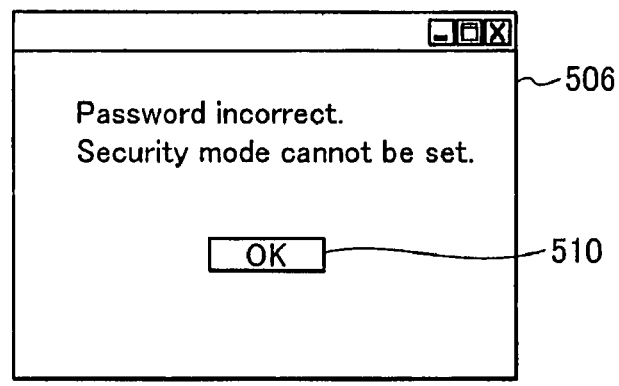
FIG. 14C is a screenshot of a third dialog box displayed by the personal computer.
Figure 14D:
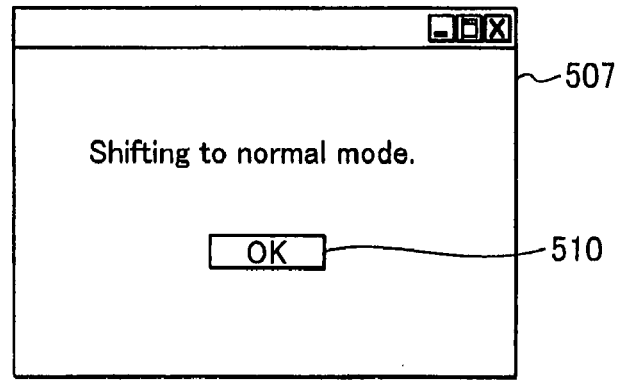
FIG. 14D is a screenshot of a fourth dialog box displayed by the personal computer.

The personal computer 3 displays a dialog box 500, such as that shown in FIG. 14A. As shown in FIG. 14A, the current access mode acquired above is displayed in a field 501. Graphical buttons 503 and 504 for selecting modes are also displayed in the dialog box 500. By clicking on one of the buttons 503 and 504 with a mouse or the like, the user can select the desired access mode. This inputting process is performed in S302 of FIG. 12. If the user selects the normal mode, the personal computer 3 displays a confirmation dialog box 507, such as that shown in FIG. 14D. When the user clicks on an OK button 510 in the confirmation dialog box 507, the personal computer 3 performs a mode setting process. Specifically, in S303 the CPU 41 issues a second Inq(1) command with supplementary information written in the corresponding CDB(1) requesting that the multi-reader/writer 2 shift to the normal mode. Upon receiving this CDB(1), the multi-reader/writer 2 sets the access mode to the normal mode and returns a VPD including supplementary response information indicating that the setting is complete. When the personal computer 3 receives the VPD, in S304 the personal computer 3 updates the field 501 in the dialog box 500 of FIG. 14A to the normal mode.

However, when selecting the security mode in S302, the user inputs a password in a password field 502 of the dialog box 500 shown in FIG. 14A using the keyboard 57 or the like, and clicks on the button 504. At this time, the CPU 41 issues a second Inq(1) command with the inputted password written to the corresponding CDB(1) as the supplementary information and transmits the CDB(1) to the multi-reader/writer 2. This password must be transmitted to the multi-reader/writer 2 as character string data. Character string data is configured of bit code data (character codes) having a one-to-one correspondence to each character to be displayed and may be configured of an existing code, such as JIS, shift JIS, or ASCII or a unique code.

The character string data is transmitted according to the following procedure. First the CPU 41 issues the Inq(1) command as allocation length of the initial character of the character string. By issuing the Inq(1) command, CDB(1) data (Table 4) is generated and transmitted to the multi-reader/writer 2. Although the multi-reader/writer 2 returns the VPD in Table 7 when the personal computer 3 issues the Inq(1) command, the personal computer 3 merely receives the Inq (1) command and does not execute a special process. The CPU 41 repeats issuing the Inq(1) command a number of times which equals the number of characters in the inputted password character string.

In this way, upon receiving the character string data, the multi-reader/writer 2 stores the received data in the RAM 29. As described above, the characters are transmitted one at a time in S305 (see FIG. 12), and the multi-reader/writer 2 sequentially stores the character data in the RAM 29.

The personal computer 3 again issues an Inq(1) command in S306, generating CDB(1) data that is transmitted to the multi-reader/writer 2. Table 8 shows the CDB(1) data generated at this time. As shown in Table 8, "0xE0" is stored in byte 2 and "0x13" is stored in the allocation length region. Hence, based on Table 6, the Inq(1) command issued at this time is understood to be a command to shift to the security mode based on the received password.

TABLE 8

| CDB(1) | | |
|---|---|---|
| Byte | Value | Remarks |
| 0 | 0x12 | Inquiry code no. |
| 1 | 0x01 | SCSI-LUN, EVPD = 1 |
| 2 | 0xE0 | Page code when EVPD = 1 |
| 3 | 0x00 | Reserved (fixed to 0) |
| 4 | 0x13 | Allocation length |
| 5 | 0x00 | Control byte (fixed to 0) |

The multi-reader/writer 2 performs the authentication process according to the method described above, setting the access mode to the security mode when authentication is accepted, and returning the results written in the VPD to the personal computer 3. Upon receiving the VPD, the personal computer 3 advances to S307 and updates the field 501 in the dialog box 500 of FIG. 14A to the security mode. When the returned results indicate that authentication has been rejected, the CPU 41 displays a dialog box 506, such as that shown in FIG. 14C, reporting that the request to enter the security mode has failed.

FIG. 13 shows steps in a status switching task executed according to SCSI protocol on the multi-reader/writer 2 in response to the process described in FIG. 12. In S1401 the CPU 27 sets the access mode to the normal mode. In S1402 the CPU 27 determines whether the command received from the personal computer 3 is a command for shifting to the security mode. If so (S1402: YES), then in S1403 the CPU 27 confirms whether a memory card is inserted in a slot. If a memory card is not present (S1403: NO), then in S1404 the CPU 27 notifies the personal computer 3 that a memory card does not exist and returns to S1402. However, if a memory card is inserted (S1403: YES), then in S1405 the CPU 27 determines whether the memory card has a security area. If the memory card has no security area (S1405: NO), then in S1406 the CPU 27 notifies the personal computer 3 that a security area does not exist and returns to S1402.

However, if a security area is provided (S1405: YES), then in S1407 the CPU 27 decodes the check data in the check data storage area (see FIG. 15) described above using the password received from the personal computer 3 as the encryption key. At this time, if the password is shorter than a predetermined bit length, the shortage of bits is complemented by a fixed value. In S1408 the CPU 27 determines whether the decoded check data matches the original check data. If the data do not match (S1408: NO), then the CPU 27 rejects authentication, in S1409 notifies the personal computer 3 that the password is incorrect, and returns to S1402. However, if the data match (S1408: YES), then the CPU 27 accepts authentication, notifies the personal computer 3 in S1410 that the password is correct, and sets the security mode in S1411. In S1412 the CPU 27 determines whether a command has been received from the personal computer 3 to shift to the normal mode. If so (S1412: YES), then the CPU 27 returns to S1401. If not (S1412: NO), then in S1413 the CPU 27 checks whether the memory card has been removed. If the memory card has not been removed (S1413: NO), the CPU 27 returns to S1412. If the memory card has been removed (S1413: YES), then the CPU 27 returns to S1401.

While the invention has been described in detail with reference to the above aspects thereof, it would be apparent to those skilled in the art that various changes and modifications may be made therein without departing from the spirit of the invention.

What is claimed is:

1. A communication system comprising:
a host device having an authority to initiate a communication event; and
a peripheral device that is connected to the host device and that serves as a communication target of the host device, the host device being configured to issue a command for executing the communication event to the peripheral device, the peripheral device being configured to execute a data process based on the command upon receiving the command and to return to the host device response information based on execution results of the data process, the host device and the peripheral device having a communication protocol that restricts a direction for issuing the command to a one-way direction from the host device to the peripheral device, the peripheral device being constituted by a storage device having a slot to which a storage medium can be detachably mounted, the storage medium having a non-volatile memory that accepts data access including reading and writing of data, the peripheral device being configured to execute the data access to the storage medium based on the communication event,
the host device comprising:
a search-instruction-data creating unit that issues, to the peripheral device, a search request command that requests that the peripheral device performs a search report process for the peripheral device itself, and that creates search instruction data indicative of contents of the search report process and having a first predetermined frame format, the first predetermined frame format including a predetermined field that stores supplementary information;
a search-instruction-data transmitting unit that transmits the search instruction data to the peripheral device;
a security-reference-information acquiring unit that acquires security reference information; and a security-reference-information transmitting unit that transmits, to the peripheral device, the security reference information that is acquired by the security-reference-information acquiring unit and that serves as the supplementary information, the peripheral device comprising:

a search-report-data generating unit that generates a search report data having a second predetermined frame format upon receiving the search instruction data;

a search-report-data transmitting unit that transmits to the host device the search report data as the response information;

a supplementary-information extracting unit that extracts the supplementary information from the predetermined field of the search instruction data; and an authenticating unit that authenticates an access authority for accessing the storage medium from the host device, based both on security master information stored in the storage medium and on the security reference information that is received from the host device, wherein:

the communication protocol specifies that the predetermined field of the search instruction data stores primary information that is different from the supplementary information, the search-instruction-data creating unit stores the supplementary information in the predetermined field together with the primary information, the predetermined field in the search instruction data is an allocation-length setting field for storing allocation-length information used to specify a memory region on the storage medium, the memory region being allocated for reading or writing of data when the peripheral device executes the communication event for reading or writing of data in the storage medium according to the communication protocol, the search-instruction-data creating unit stores the supplementary information in the allocation-length setting field, such that the supplementary information shares the allocation-length setting field with the allocation-length information that serves as the primary information, the allocation-length setting field is set to a predetermined bit length in the communication protocol, a bit length for a maximum possible allocation length is set smaller than the predetermined bit length, and when the allocation-length setting field stores an allocation length exceeding the maximum possible allocation length, the supplementary-information extracting unit determines that an actual value of the allocation length equals to the maximum possible allocation length regardless of the allocation length described in the allocation-length setting field, and extracts bit values that exceeds the maximum possible allocation length as the supplementary information.

2. The communication system according to claim 1, wherein the peripheral device and the host device are connected via a serial communication mechanism that allows the host device to poll the peripheral device, and that prohibits the peripheral device from polling the host device, the communication system being capable of implementing data transfers between the host device and the peripheral device for executing the communication event using a form of serial communications in which the host device polls the peripheral device.

3. The communication system according to claim 2, wherein the serial communication mechanism follows USB protocol.

4. The communication system according to claim 1, wherein the host device further comprises an authentication-result requesting unit that transmits authentication-result request information to the peripheral device as the supplementary information, thereby requesting authentication-result reflecting information that reflects authentication results obtained by the authenticating unit;

wherein the peripheral device further comprises an authentication-result returning unit that returns the search report data to the host device as the response information, the search report data including the authentication-result reflecting information in a predetermined field, the authentication-result reflecting information serving as supplementary response information in response to the supplementary information; and wherein the host device further comprises an authentication-result-reflecting-information outputting unit that outputs the authentication-result reflecting information returned by the authentication-result returning unit.

5. The communication system according to claim 4, wherein the host device further comprises:

an access-mode selecting unit that selects either one of a normal mode and a security mode as an access mode; and a normal-mode-shift-instruction-information transmitting unit that transmits normal-mode-shift instruction information to the peripheral device as the supplementary information when the normal mode has been selected on the host device, the normal-mode-shift instruction information instructing the peripheral device to shift into the normal mode;

wherein the peripheral device further comprises a normal-mode-setting-complete-report-information returning unit that returns, to the host device, normal-mode-setting-complete report information contained in a predetermined field of the search report data when the access-mode setting unit has set the access mode to the normal mode, the normal-mode-setting-complete report information reporting that the normal mode has been set and serving as supplementary response information in response to the supplementary information;

wherein the host device further comprises an inputting unit that inputs the security reference information; and wherein the security-reference-information transmitting unit transmits the inputted security reference information to the peripheral device as the supplementary information.

6. The communication system according to claim 1, wherein the storage medium has a storage area divided into a normal area that can be accessed from the host device, even when the authenticating unit has rejected authentication of access privileges, and a security area that can be accessed from the host device only when the authenticating unit has accepted authentication of access privileges; and wherein the peripheral device further comprises:

an access-mode setting unit that sets an access mode for accessing the storage medium to one of a normal mode allowing access to only the normal area, and a security mode allowing access to the security area; and an access-mode-setting controlling unit that controls the access-mode setting unit to set the access mode to the security mode only when the authenticating unit has accepted authentication.

7. The communication system according to claim 6, wherein the host device further comprises an access-mode-report requesting unit that transmits access-mode-report instruction information to the peripheral device as the supplementary information, thereby requesting that the peripheral device report a type of access mode set in the peripheral device;

wherein the peripheral device further comprises an access-mode-report returning unit that returns the search report data to the host device as the response information, the search report data including access-mode-report information indicative of the type of access mode in a predetermined field, the access-mode-report information serving as supplementary response information in response to the supplementary information; and wherein the host device further comprises an access-mode-type displaying unit that displays the type of access mode returned by the access-mode-report returning unit.

8. The communication system according to claim 7, wherein the host device further comprises:

an access-mode selecting unit that selects either one of the normal mode and the security mode as the access mode; and a normal-mode-shift-instruction-information transmitting unit that transmits normal-mode-shift instruction information to the peripheral device as the supplementary information when the normal mode has been selected on the host device, the normal-mode-shift instruction information instructing the peripheral device to shift into the normal mode;

wherein the peripheral device further comprises a normal-mode-setting-complete-report-information returning unit that returns, to the host device, normal-mode-setting-complete report information contained in a predetermined field of the search report data when the access-mode setting unit has set the access mode to the normal mode, the normal-mode-setting-complete report information reporting that the normal mode has been set and serving as supplementary response information in response to the supplementary information;

wherein the host device further comprises an inputting unit that inputs the security reference information; and wherein the security-reference-information transmitting unit transmits the inputted security reference information to the peripheral device as the supplementary information.

9. A communication system comprising:

a host device having an authority to initiate a communication event; and a peripheral device that is connected to the host device and that serves as a communication target of the host device, the host device being configured to issue a command for executing the communication event to the peripheral device, the peripheral device being configured to execute a data process based on the command upon receiving the command and to return to the host device response information based on execution results of the data process, the host device and the peripheral device having a communication protocol that restricts a direction for issuing the command to a one-way direction from the host device to the peripheral device, the peripheral device being constituted by a storage device having a slot to which a storage medium can be detachably mounted, the storage medium having a non-volatile memory that accepts data access including reading and writing of data, the peripheral device being configured to execute the data access to the storage medium based on the communication event, the host device comprising:

a search-instruction-data creating unit that issues, to the peripheral device, a search request command that requests that the peripheral device performs a search report process for the peripheral device itself, and that creates search instruction data indicative of contents of the search report process and having a first predetermined frame format, the first predetermined frame format including a predetermined field that stores supplementary information;

a search-instruction-data transmitting unit that transmits the search instruction data to the peripheral device;

a security-reference-information acquiring unit that acquires security reference information; and a security-reference-information transmitting unit that transmits, to the peripheral device, the security reference information that is acquired by the security-reference-information acquiring unit and that serves as the supplementary information, the peripheral device comprising:

a search-report-data generating unit that generates a search report data having a second predetermined frame format upon receiving the search instruction data;

a search-report-data transmitting unit that transmits to the host device the search report data as the response information;

a supplementary-information extracting unit that extracts the supplementary information from the predetermined field of the search instruction data; and an authenticating unit that authenticates an access authority for accessing the storage medium from the host device, based both on security master information stored in the storage medium and on the security reference information that is received from the host device, wherein:

the peripheral device further comprises:

an exchange-notification-information holding unit that holds exchange notification information that is used to notify the host device that the storage medium has been exchanged when such an exchange has occurred; and an exchange-notification-information holding controlling unit that clears the exchange notification information when a predetermined first-type command has been received from the host device and the first-type command has been executed, and that maintains the exchange notification information when a second-type command has been received from the host device and the second-type command has been executed, the second-type command being different from the first-type command, and the second-type command is used as the search request command.

10. The communication system according to claim 9, wherein the search request command is a configuration-attribute search request command that commands the peripheral device to report configuration-attribute identification information that identifies configuration and attributes of the peripheral device.

11. The communication system according to claim 10, wherein the communication protocol is SCSI protocol that uses an Inquiry command as the search request command.

12. A peripheral device that is configured to be connected to a host device and that serves as a communication target of the host device, the host device being configured to issue a command for executing a communication event to the peripheral device, the peripheral device being configured to execute a data process based on the command upon receiving the command and to return to the host device response information based on execution results of the data process, the host device and the peripheral device having a communication protocol that restricts a direction for issuing the command to a one-way direction from the host device to the peripheral device, the peripheral device being constituted by a storage device having a slot to which a storage medium can be detachably mounted, the storage medium having a non-volatile memory that accepts data access including reading and writing of data, the peripheral device being configured to execute the data access to the storage medium based on the communication event, the peripheral device comprising:

- a search-report-data generating unit that generates a search report data having a second predetermined frame format upon receiving search instruction data from the host device, the search instruction data having a first predetermined frame format that includes a predetermined field that stores supplementary information;
- a search-report-data transmitting unit that transmits to the host device the search report data as the response information;
- an supplementary-information extracting unit that extracts the supplementary information from the predetermined field of the search instruction data; and
- an authenticating unit that authenticates an access authority for accessing the storage medium from the host device, based both on security master information stored in the storage medium and on a security reference information that is received from the host device, wherein:
- the communication protocol specifies that the predetermined field of the search instruction data stores primary information that is different from the supplementary information,
- the predetermined field in the search instruction data is an allocation-length setting field for storing allocation-length information used to specify a memory region on the storage medium,
- the supplementary information is stored, by the host device, in the predetermined field together with the primary information, and in the allocation-length setting field such that the supplementary information shares the allocation-length setting field with the allocation-length information that serves as the primary information,
- the memory region is allocated for reading or writing of data when the peripheral device executes the communication event for reading or writing of data in the storage medium according to the communication protocol,
- the allocation-length setting field is set to a predetermined bit length in the communication protocol,
- a bit length for a maximum possible allocation length is set smaller than the predetermined bit length, and
- when the allocation-length setting field stores an allocation length exceeding the maximum possible allocation length, the supplementary-information extracting unit determines that an actual value of the allocation length equals to the maximum possible allocation length regardless of the allocation length described in the allocation-length setting field, and extracts bit values that exceeds the maximum possible allocation length as the supplementary information.

* * * * *